US006364330B1

(12) United States Patent
Weber et al.

(10) Patent No.: US 6,364,330 B1
(45) Date of Patent: Apr. 2, 2002

(54) ERGONOMIC PLATFORM TRUCK

(75) Inventors: Dennis R. Weber; Matthew Z. Neal, both of Mansfield, OH (US)

(73) Assignee: Problem Solvers Co., Mansfield, OH (US)

( * ) Notice: Subject to any disclaimer, the term of this patent is extended or adjusted under 35 U.S.C. 154(b) by 0 days.

(21) Appl. No.: 09/514,081

(22) Filed: Feb. 25, 2000

Related U.S. Application Data

(63) Continuation-in-part of application No. 08/843,802, filed on Apr. 21, 1997, now Pat. No. 6,035,973.

(51) Int. Cl.$^7$ ............................................. B62B 3/00
(52) U.S. Cl. ........................... 280/47.35; 280/47.29; 280/79.3; 187/244; 108/136
(58) Field of Search ................... 187/244, 243, 187/240, 222, 231, 267, 230, 249; 312/60, 71; 280/47.27, 47.29, 47.41, 79.2, 79.3, 47.35; 211/49.1; 414/490; 108/136

(56) References Cited

U.S. PATENT DOCUMENTS

| 2,306,385 A | 12/1942 | Herter .......................... 62/89.5 |
| 2,468,115 A | 4/1949 | Saul, Jr. ......................... 220/93 |
| 2,626,727 A | 1/1953 | Gibbs et al. .................... 220/93 |
| 2,649,992 A | 8/1953 | Bockius ........................ 220/93 |
| 2,662,802 A | 12/1953 | Gibbs ............................ 312/71 |
| 2,692,177 A | 10/1954 | Larsen .......................... 312/71 |
| 2,709,561 A | 5/1955 | Shelley ........................ 248/204 |
| 2,717,085 A | 9/1955 | Waddington .................. 211/74 |
| 2,773,604 A | 12/1956 | Grauss .......................... 211/49 |
| 2,802,575 A | 8/1957 | Harrison ....................... 211/51 |
| 2,812,104 A | 11/1957 | Larsen .......................... 220/93 |
| 2,928,639 A | 3/1960 | Shelley ........................ 248/204 |
| 3,276,830 A | 10/1966 | Vorndran ...................... 312/71 |
| 3,327,655 A | 6/1967 | MacKay ...................... 108/136 |
| 3,388,677 A | 6/1968 | MacKay ...................... 108/136 |
| 3,407,015 A | 10/1968 | Silberberg .................... 312/71 |
| 3,418,031 A | 12/1968 | Fisher ......................... 312/319 |
| 3,511,548 A | 5/1970 | McIlhone ..................... 312/71 |
| 3,663,078 A | 5/1972 | Moore et al. ................. 312/71 |
| 3,739,879 A | 6/1973 | House ........................... 187/24 |
| 3,747,733 A | 7/1973 | Knickerbocker ............. 194/10 |
| RE28,311 E | 1/1975 | Cummings ................... 312/71 |

(List continued on next page.)

FOREIGN PATENT DOCUMENTS

| DE | 566326 | * 12/1932 |
| JP | 3223025 | * 10/1991 |

*Primary Examiner*—Brian L. Johnson
*Assistant Examiner*—Bryan Fischmann
(74) *Attorney, Agent, or Firm*—Emerson & Skeriotis; Roger D. Emerson; Timothy D. Bennett

(57) ABSTRACT

A dual ergonomic platform truck includes a frame assembly having a pair of first and second segments, a pair of guide rods each having a first end connected to one of the first segments and a second end connected to one of the second segments. A pair of platform assemblies are moveable along the pair of guide rods respectively. Each platform assembly includes a deck guide that receives the guide rod and a platform that is connected to the deck guide and is constructed to hold items. Each platform assembly also includes a first linear bearing that is received within the deck guide and a spring support bracket connected to the deck guide. A pair of springs are used to lift the pair of platform assemblies respectively. Each spring is connected to the first and second segments of the frame assembly. The platform truck may also include a self-aligning platform assembly. A handtruck includes a frame assembly, at pair of wheels, a guide rod, a platform assembly that is moveable along the guide rod, and a spring that provides a lifting force to the platform assembly. The handtruck may also include a latch system for use in preventing the platform assembly from moving along the guide rod and a hydraulic cylinder or frictional dampers for use in damping (slowing) the spring force as it is applied to the platform assembly.

35 Claims, 28 Drawing Sheets

U.S. PATENT DOCUMENTS

| | | | |
|---|---|---|---|
| 3,941,440 A | 3/1976 | Menzin et al. | 312/71 |
| 3,947,054 A | 3/1976 | Hall | 280/36 |
| RE28,936 E | 8/1976 | Talamantez | 280/5.2 |
| 3,981,551 A * | 9/1976 | Miyazaki et al. | 312/71 X |
| 4,009,915 A | 3/1977 | Whitelaw et al. | 312/71 |
| 4,073,388 A | 2/1978 | Carter | 214/8.5 A |
| 4,161,146 A | 7/1979 | Kooiman | 108/136 |
| 4,206,954 A | 6/1980 | Kooiman | 312/71 |
| 4,243,153 A * | 1/1981 | Mitchell | 312/71 X |
| 4,357,127 A | 11/1982 | Kooiman | 414/99 |
| 4,504,071 A | 3/1985 | Drummond | 280/5.24 |
| 4,545,463 A | 10/1985 | Olovsson | 187/9 R |
| 4,776,603 A | 10/1988 | Watts | 280/47.27 |
| 4,867,277 A | 9/1989 | Sloan | 187/9 E |
| 5,167,302 A * | 12/1992 | Kinoshita | 187/244 |
| 5,199,600 A | 4/1993 | Fietsam | 221/241 |
| 5,251,922 A * | 10/1993 | Mann | 414/490 |
| 5,421,481 A | 6/1995 | Fortmann et al. | 221/271 |
| 5,542,500 A | 8/1996 | Emrey | 187/273 |
| 5,626,206 A * | 5/1997 | Weber et al. | 187/244 |
| 5,893,615 A | 4/1999 | Hendricks | 312/71 |
| 6,035,973 A * | 3/2000 | Neal et al. | 187/244 |
| 6,044,932 A * | 4/2000 | Neal et al. | 187/240 |

* cited by examiner

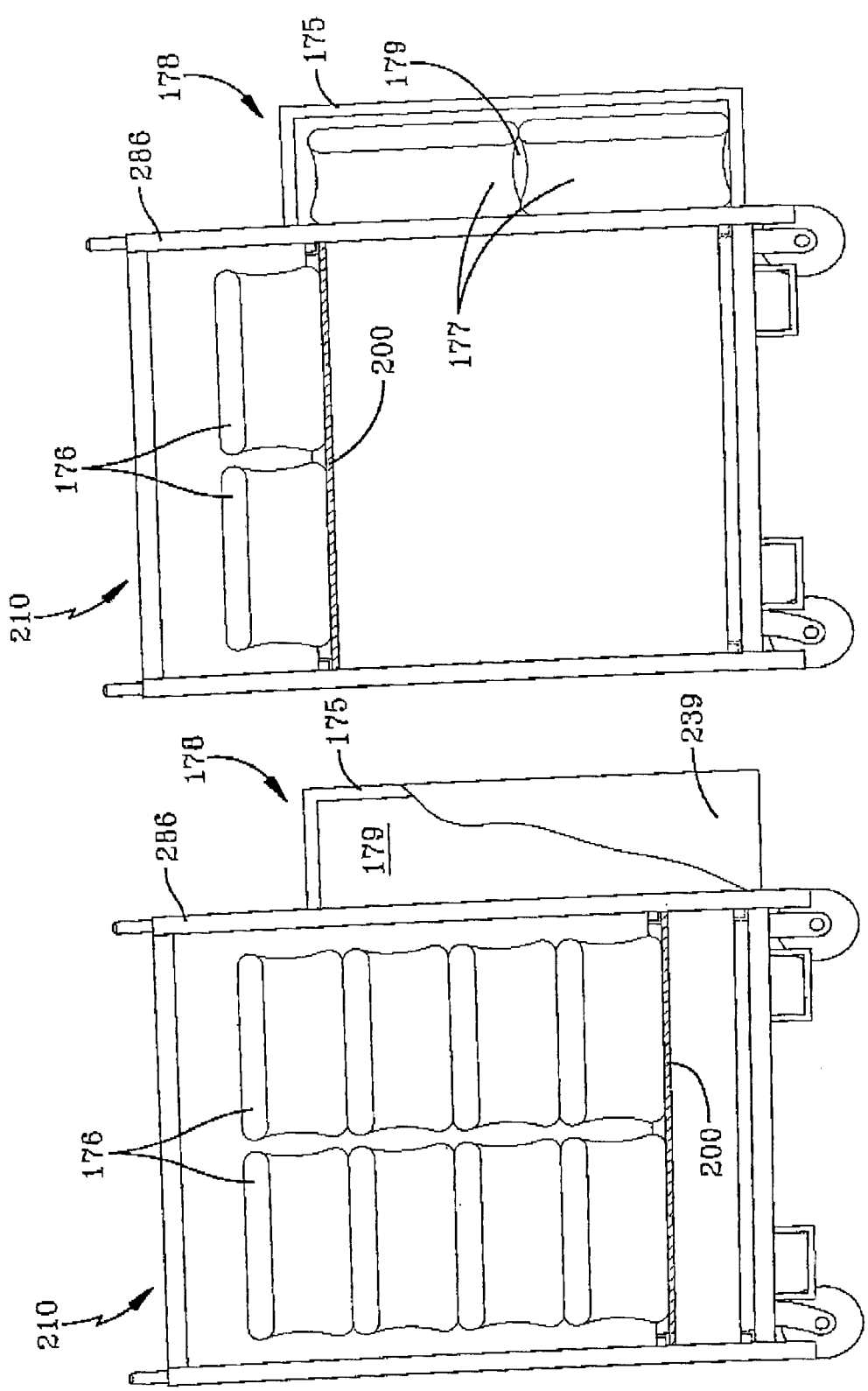

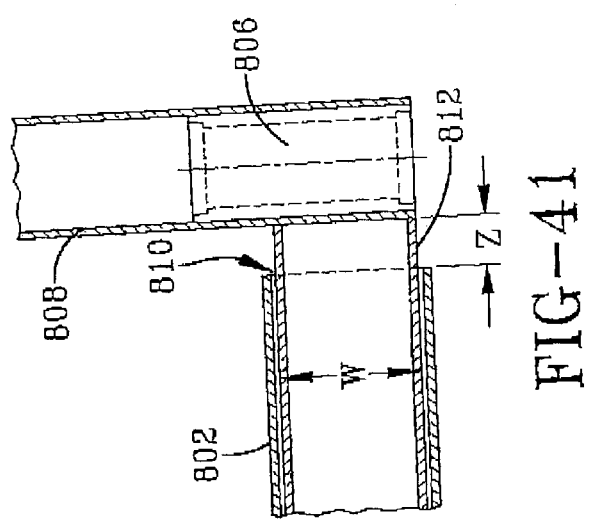
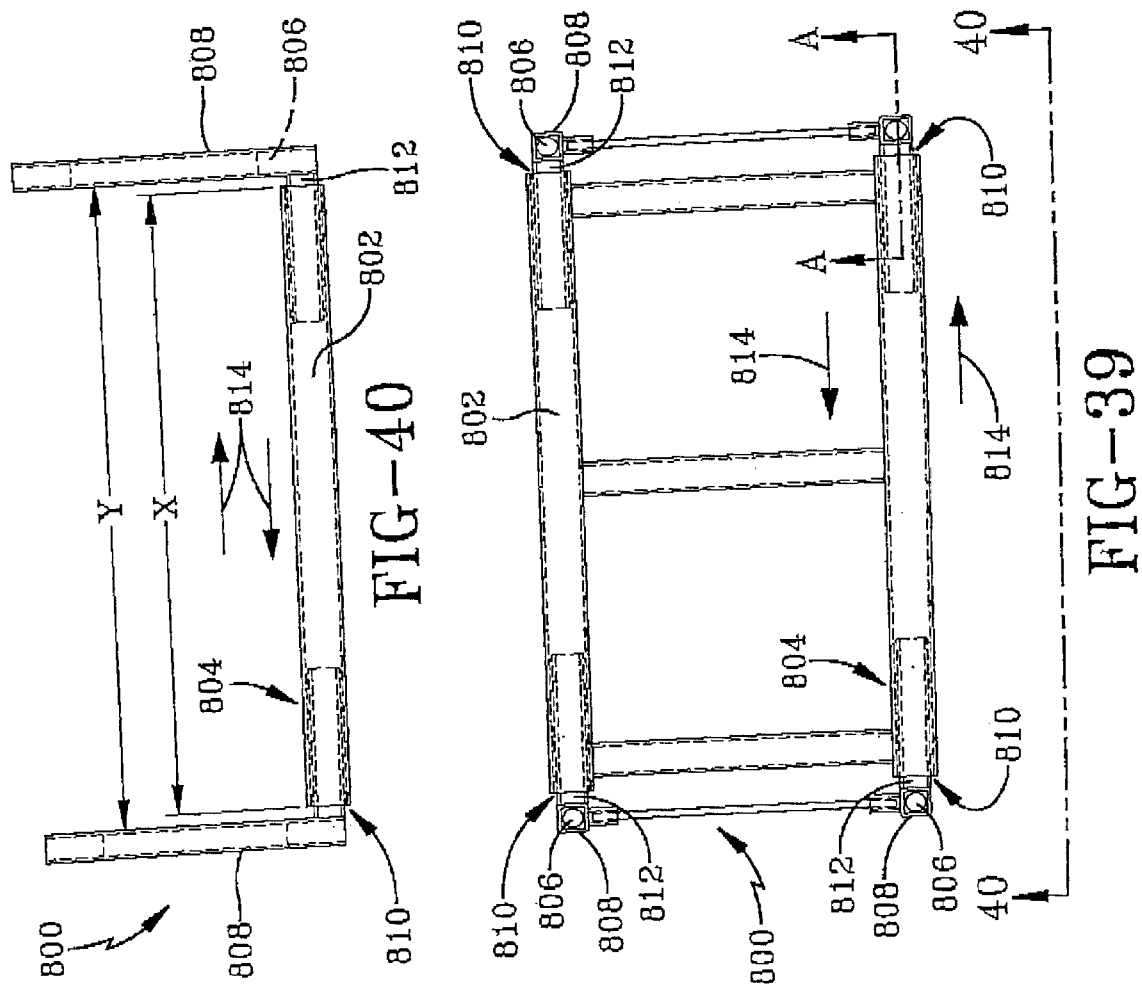

ERGONOMIC PLATFORM TRUCK

This application is a Continuation-In-Part of U.S. patent application Ser. No. 08/843,802, filed Apr. 21, 1997, now U.S. Pat. No. 6,035,973.

BACKGROUND OF THE INVENTION

1. Field of Invention

The present invention pertains to methods and apparatuses for adjusting the height of parts or other items for use by an operator and more particularly to methods and apparatuses for providing an ergonomic platform truck including a platform assembly that is moveable along a pair of guide rods.

2. Description of the Related Art

It is known to provide a vertical adjustment mechanism for maintaining parts at a vertical position within a parts bin.

A problem commonly encountered in the art deals with a reliable means for maintaining a platform, which holds the parts, at a required vertical position when parts are removed or added.

Another problem encountered in the art deals with the position of the lifting means used to lift the platform. Typically, the lifting means is positioned directly below the platform. Such positioning does not take full advantage of the space under the platform.

Another problem encountered in the art deals with the stability of the apparatus. Often the platform is connected to the lifting means and the parts bin in only one or a few places.

Still another problem in the art relates to inconsistencies in the platform truck. These inconsistencies may be caused by inaccuracies in the material or manufacturing in the fabrication of the ergonomic platform truck. Inconsistencies to the platform truck may also be caused by forces exerted on the truck, such as by the collision of the truck with a wall or another truck. All such inconsistencies can create misalignment problems for the platform.

The present invention provides methods and apparatuses for reducing these problems. The difficulties inherent in the art are therefore overcome in a way, which is simple and efficient, while providing better and more advantageous results.

SUMMARY OF THE INVENTION

It is an object of the present invention to eliminate injuries caused by bending to remove parts from a parts bin.

It is another object of the present invention to disclose a device for and a method of vertically adjusting parts in a parts bin to minimize the bending required to remove a part from the parts bin.

It is another object of the present invention to disclose a device for and method of adjusting the height of parts in a parts bin that is under the control of a human operator.

It is another object of the present invention to disclose a device for and method of vertically adjusting the height of parts in a parts bin that is under the control of an electronic device.

It is another object of the present invention to disclose a device for and method of vertically adjusting parts in a parts bin by a mechanical, hydraulic, or pneumatic mechanism.

It is another object of the present invention to disclose a device for and method of vertically adjusting parts in a parts bin that is portable.

It is another object of the present invention to disclose a device for and method of vertically adjusting parts in a parts bin that is removable from the parts bin.

It is another object of the present invention to disclose a device for and a method of vertically adjusting parts in a parts bin that fits into any size parts bin and vertically adjusts parts of any size or weight.

It is another object of the present invention to disclose a device for and method of vertically adjusting parts in a parts bin that is strong, lightweight, long lasting, economic, and ergonomic.

It is another object of the present invention to disclose a device for and method of vertically adjusting parts in a parts bin using a spring having a spring constant chosen and matched to the weight of the parts stored in the parts bin.

It is another object of the present invention to disclose a device for and method of vertically adjusting parts in a parts bin where the lifting means is located externally to the platform.

The objects of the present invention are realized by disclosing a device for and method of vertically adjusting parts in a parts bins to a level that minimizes the bending and movement required by a human operator to remove a part from the parts bin. It is believed that injuries would be avoided by eliminating unnecessary bending of the lower back, eliminating unnecessary pulling on the shoulders, eliminating unnecessary pulling on the upper back, and other similar movements.

The present invention discloses a device for and method of vertically adjusting parts in a parts bin that includes a mechanism for accepting input from an operator that results in a vertical adjustment that is under the control of the operator.

The present invention discloses a device for and method of vertically adjusting parts in a parts bin that includes an electronic device that vertically adjusts the parts in a parts bin without any input from an operator.

The present invention discloses a device for and method of vertically adjusting parts in a parts bin that utilizes either a mechanical, a hydraulic, and a pneumatic mechanism to vertically adjust the parts in a parts bin. Each of these means for lifting are either under the control of the operator or is controlled electronically or automatically, without any input from an operator.

The present invention discloses a device for and method of vertically adjusting parts in a parts bin that is portable or permanently mounted within the bin.

The lifting mechanism, and the electronic leveling device, when utilized, can be made to fit any size parts bin and level any type of part.

The present invention discloses a device for and method of vertically adjusting parts in a parts bin that is made of strong, lightweight, long-lasting, economic, and ergonomic materials such as polyethylene which will not rust, mildew or deteriorate, is easy to clean, and is impervious to moisture oils, and most chemical agents.

The present invention discloses a device for and method of vertically adjusting parts in a parts bin that uses a calibrated spring as a lifting means. The spring is calibrated or chosen to correspond to the weight of parts stored in the parts bin. The spring constant of the spring (the spring constant is "k" in the equation $F=kx$, where "F" equals the force supplied by the spring and "x" equals a spring displacement distance) is selected so that the weight of the parts removed will cause the platform to move through a distance "x". The distance "x" is also essentially equal to the height of parts being removed from the bin. The force ("F") supplied by the spring causes the platform to rise a height generally equal to the height of the parts removed. Through this mechanism, the spring keeps the parts at the proper height, so that an operator does not have to provide any input to keep the parts in the parts bin at the proper vertical adjustment.

Through the same mechanism, the ergonomic parts bin elevator of the present invention lowers the parts in the parts bins as additional parts are added to the parts bin in order to keep the parts in the parts bin at a vertical position that minimizes the bending required to remove a part from the parts bin. As parts are removed from the parts bin, the present invention raises the level of the parts in the parts bin so that the parts remaining in the parts bin maintain the vertical position that minimizes the bending required to remove a part from the parts bin.

The present invention can be made to be portable or stationary. It can be designed to fit into any existing parts bin. It can be made to vertically adjust to any type of part.

The present invention discloses a method for emptying parts from a platform truck. First parts are emptied from a parts container positioned on the platform of a platform truck. Next, the size of an open storage space under the platform is increased. Finally, the parts container is stored in the open storage space.

The advantages and benefits of the present invention are that bending is minimized, and therefore, injuries due to bending are reduced. Damage to parts is reduced, since fewer parts will be dropped due to the lower strain associated with the minimized bending of the present invention. The present invention is easy to use, can be automatic, and requires minimal maintenance.

Productivity is increased due to the reduced time and strain required to move parts in and out of the parts bin, and costs and expenses are minimized, due to a reduction in parts damage.

Another advantage of the present invention is that the space under the platform is usable for storage, dunnage or other purposes.

Still another advantage of the present invention is that the platform moves smoothly along guide rods with no binding. The linear bearings also eliminate any tipping factor.

Another advantage of the present invention is that the ergonomic platform truck may be positioned at a pitch angle with respect to a vertical line while continuing to eliminate any tipping factor.

Another advantage of this invention is that a dual platform truck having a pair of platform assemblies is provided.

Yet another advantage of this invention is that an ergonomic handtruck is provided having a platform assembly and being easily transported from place to place.

Another advantage of this invention is that the platform is self-aligning and thus able to easily compensate for possible inconsistencies that may be caused by excessive forces or by material or manufacturing inaccuracies in the fabrication of the ergonomic platform truck.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings, which form a part hereof and herein:

FIG. 15 is a front view of an ergonomic platform truck which has a storage assembly mounted to the bin.

FIG. 16 is a front view of the ergonomic platform truck of FIG. 15 showing how the storage assembly can be used to store empty parts containers.

FIG. 39 is a top view of another platform truck embodiment, a self-aligning platform assembly.

FIG. 40 is a side view taken along the line 40—40 of FIG. 39.

FIG. 41 is a partial sectional view taken along the line A—A of FIG. 40 showing the adjustment gap Z between the platform and the deck guide.

DESCRIPTION OF THE PREFERRED EMBODIMENT

Figure 1:
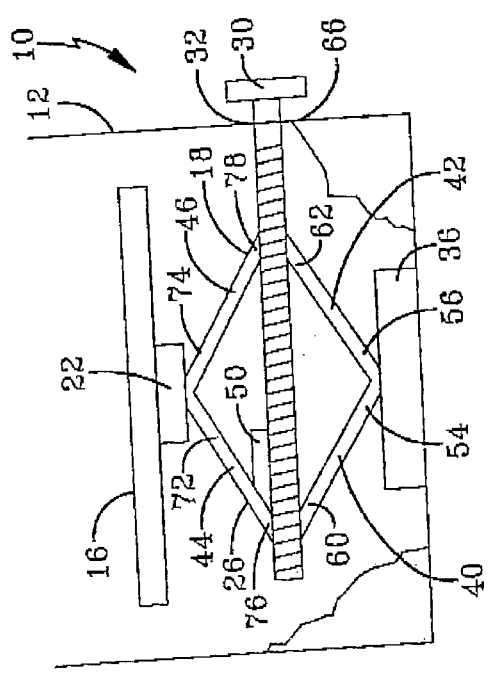
FIG. 1 is a cut-away schematic front view of a first embodiment of the present invention.

Referring now to the drawings wherein the showings are for purposes of illustrating a preferred embodiment of the invention only and not for purposes of limiting the same, the present invention is a device for and method of vertically adjusting parts in a parts bins to a level that minimizes the bending required of a human operator to remove a part from, or add parts to, the parts bin. FIG. 1 is a cut-away view of a first embodiment 10 of the present invention.

The first embodiment 10 of the present invention includes a parts bin 12 for holding parts (not shown) on a platform 16 for defining the lowest vertical position that a part can take in the parts bin 12, and a lifting mechanism 18 for vertically adjusting the platform 16 so that the parts in the parts bin 12 are always at a vertical position that minimizes the bending required of an operator to remove parts from, or add parts to, the parts bin 12. Platform 16 may be a container, which is attached to the planar platform 16 or upper panel 22. Platform 16 can be permanently or removably attached to upper panel 22.

The lifting mechanism 18 for lifting the platform 16 can be realized in any one of a number of ways. One possible realization is a scissor-type jack 26 as depicted in FIG. 1. The scissor-type jack 26 shown in FIG. 1 has a crank 30 extending through an opening 32 in the parts bin 12. The crank 30 enables an operator to vertically adjust the level of the parts to a level that minimizes the bending required of an operator to remove parts from, or add parts to, the parts bin 12. The scissor-type jack 26 of FIG. 1 includes a pedestal 36, a first support member 40, a second support member 42, a third support member 44, a fourth support member 46, planar platform 16, a threaded bar 50, and a crank 30.

The first support member 40 and the second support member 42 are pivotally joined to the pedestal 36 at a first end 54, 56 respectively. A second end 60 of the first support member 40 and second end 62 of the second support member 42 each have a threaded hole (not shown). The threaded hole of the first support member 40 faces the threaded hole of the second support member 42 so that the threaded bar 50 can travel through these holes to adjust the distance between the first support member 40 and the second support member 42 and, therefore, the vertical position of the platform 16. The crank 30 is connected to a first end 66 of the threaded bar 50 and is used to adjust the distance between the first support member 40 and the second support member 42. The third support member 44 and the fourth support member 46 are pivotally joined to the upper panel 22 at their first ends 72,74, respectively. The second end 76 of the third support member 44 and the second end 78 of the fourth support member 46 each have a threaded hole (not shown). The threaded hole of the third support member 44 faces the threaded hole of the fourth support member 46. The threaded hole end of the third support member 44 is pivotally joined to the threaded-hole end of the first support member 40 so that the threaded bar 50 can travel through these holes and adjust the vertical position of the upper panel 22 and, therefore, the platform 16. The threaded-hole end of the fourth support member 46 is pivotally joined to the threaded-hole end of the second support member 42 so that the threaded bar 50 can travel through these holes and adjust the vertical position of the upper panel 22 and, therefore, the platform 16. Vertically adjusting the upper panel 22 via the crank 30 results in the vertical adjustment of the platform 16 and the parts.

Figure 2:
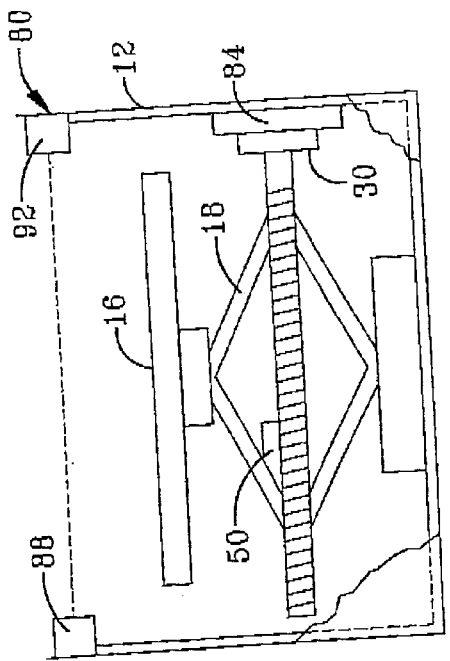
FIG. 2 is a cut-away schematic front view of a second embodiment of the present invention.

FIG. 2 depicts a second embodiment 80 of the present invention that is, essentially, the same as the device of FIG. 1 with the addition of electronics to automatically adjust the vertical position of the parts. In FIG. 2, the lifting mechanism 18 (e.g., a scissor-type jack) for vertically adjusting the parts, is fully contained within the parts bin 12. A motor 84 automatically turns the crank 30 of the scissor-type jack 26 in order to raise, or lower, the lifting mechanism 18. A light-emitting diode (LED) 88 is attached to the inside top of one of the walls of the parts bin 12. A photo-detector 92 is attached to the inside top wall of the parts bin 12 that is directly across from, and in the light path of, the light-emitting diode 88. The light-emitting diode 88 and the photo-detector 92 are electrically connected to the motor 84 so that the motor 84 will turn the crank 30 and vertically adjust the platform 16 and the parts, so that the light beam from the light-emitting diode 88 is just barely interrupted. Electronics (not shown) are contained within the motor 84 that turns the crank 30 so that the platform 16 is vertically adjusted to the point where the light beam from the light-emitting diode 88 is just interrupted. The electronics in the motor 84 will periodically raise, and lower, the platform 16 in order to check the position of the platform 16 to maintain the vertical position of the parts to a level that just barely interrupts the light from the light-emitting diode 88. This ensures that the vertical position of the platform 16 is lowered whenever parts are added to it. When parts are removed, the light from the light-emitting diode 88 is no longer interrupted. Photo-detector 92 then detects light emitted from the light-emitting diode 88 and signals the motor 84 to turn the crank 30 in order to raise the platform 16 and parts positioned thereon, so that the light from the light-emitting diode 88 is interrupted once again. This ensures that the parts in the parts bin 12 are always at the vertical position that minimizes the bending required of an operator to remove a part from, or add a part to, the parts bin 12.

Figure 3:
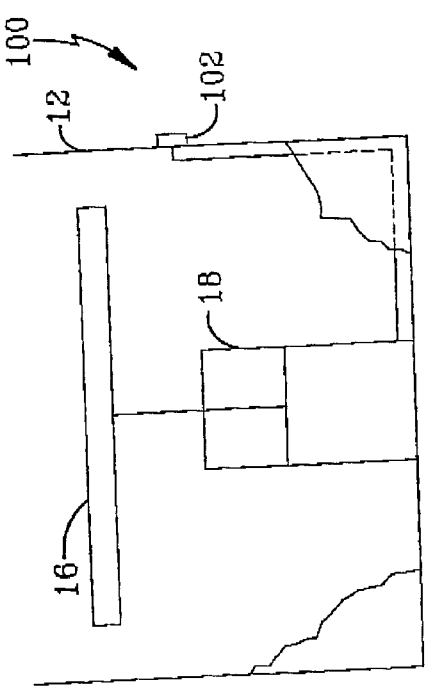
FIG. 3 is a cut-away schematic front view of a third embodiment of the present invention.

FIG. 3 depicts the third embodiment 100 of the present invention that is, essentially, the same as the device of FIG. 1 with a different type of lifting mechanism (shown as 18 in FIG. 1). In FIG. 3, the lifting mechanism 18 can be either a hydraulic cylinder or a pneumatic cylinder. As in FIG. 1, the lifting mechanism 18 of FIG. 3 extends outside of the parts bin 12 so that an operator can provide an input via a control device 102 (e.g., a switch) to control the vertical position of the platform 16 and, therefore, the vertical position of the parts in the parts bin 12.

Figure 4:
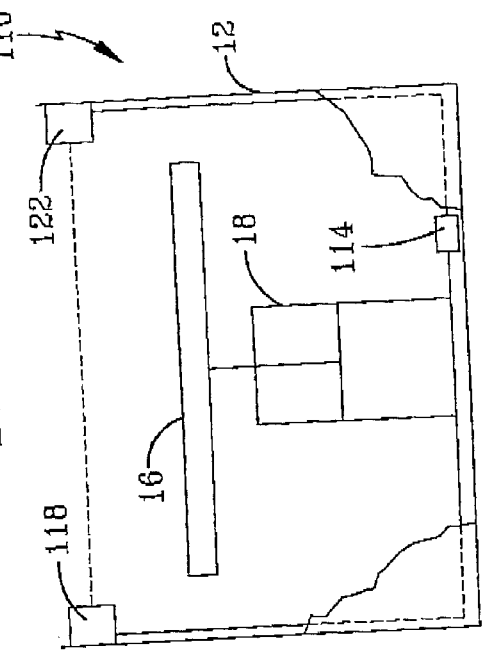
FIG. 4 is a cut-away schematic front view of a fourth embodiment of the present invention.

FIG. 4 depicts a fourth embodiment 110 of the present invention that is, essentially, the same as the device of FIG. 3 with the addition of electronics to automatically adjust the vertical position of the parts in the parts bin 12. In FIG. 4, the lifting mechanism 18 (i.e., either a hydraulic cylinder or a pneumatic cylinder) is fully contained within the parts bin 12. A motor 114 is added that automatically adjusts the vertical position of the lifting mechanism 18. A light-emitting diode 118 is attached to the inside top of one of the walls of the parts bin 12. A photo-detector 122 is attached to the inside top wall of the parts bin 12 that is directly across from, and in the light path of, the light-emitting diode 118. The light-emitting diode 118 and the photo-detector 122 are connected to the motor 114 so that the motor 114 will raise, or lower, the lifting mechanism 18 and, therefore, vertically adjust the platform 16 and the parts enough to just barely interrupt the light beam from the light-emitting diode 118 to the photo-detector 122. Electronics (not shown) are contained within the motor 114 to adjust the vertical position of the lifting mechanism 18 so that the platform 16 is vertically adjusted to the point where the light beam from the light-emitting diode 118 is just interrupted. The electronics in the motor 114 will periodically raise, and lower, the platform 16 in order to check the position of the parts. This ensures that the vertical position of the platform 16 is lowered whenever parts are added to the parts bin 12. When parts are removed from the parts bin 12, the light from the light-emitting diode 118 will no longer be interrupted and the photo-detector 122 will detect light emitted from the light-emitting diode 118 and signal the motor 114 to vertically adjust the lifting mechanism 18 in order to raise the platform 16 and parts positioned thereon, so that the light from the light-emitting diode 118 is interrupted once again. This ensures that the parts are always at the vertical position that minimizes the bending required of an operator to remove a part from, or add a part to, the parts bin 12.

Figure 5:
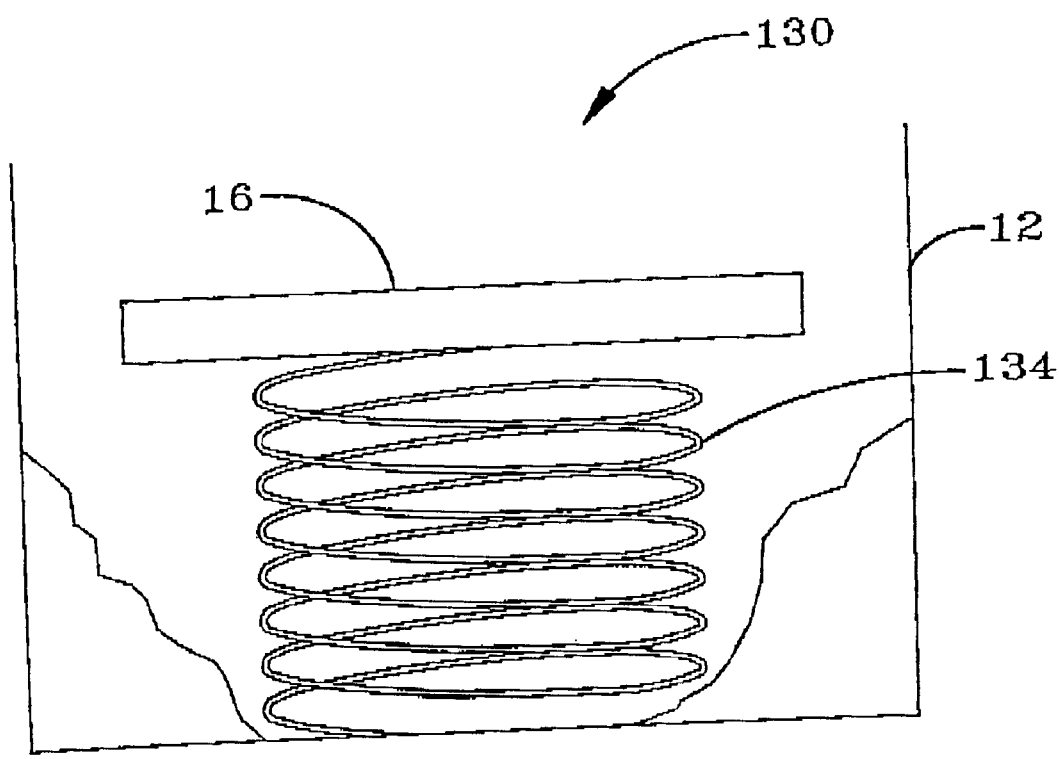
FIG. 5 is a cut-away schematic front view of a fifth embodiment of the present invention.
Figure 6:
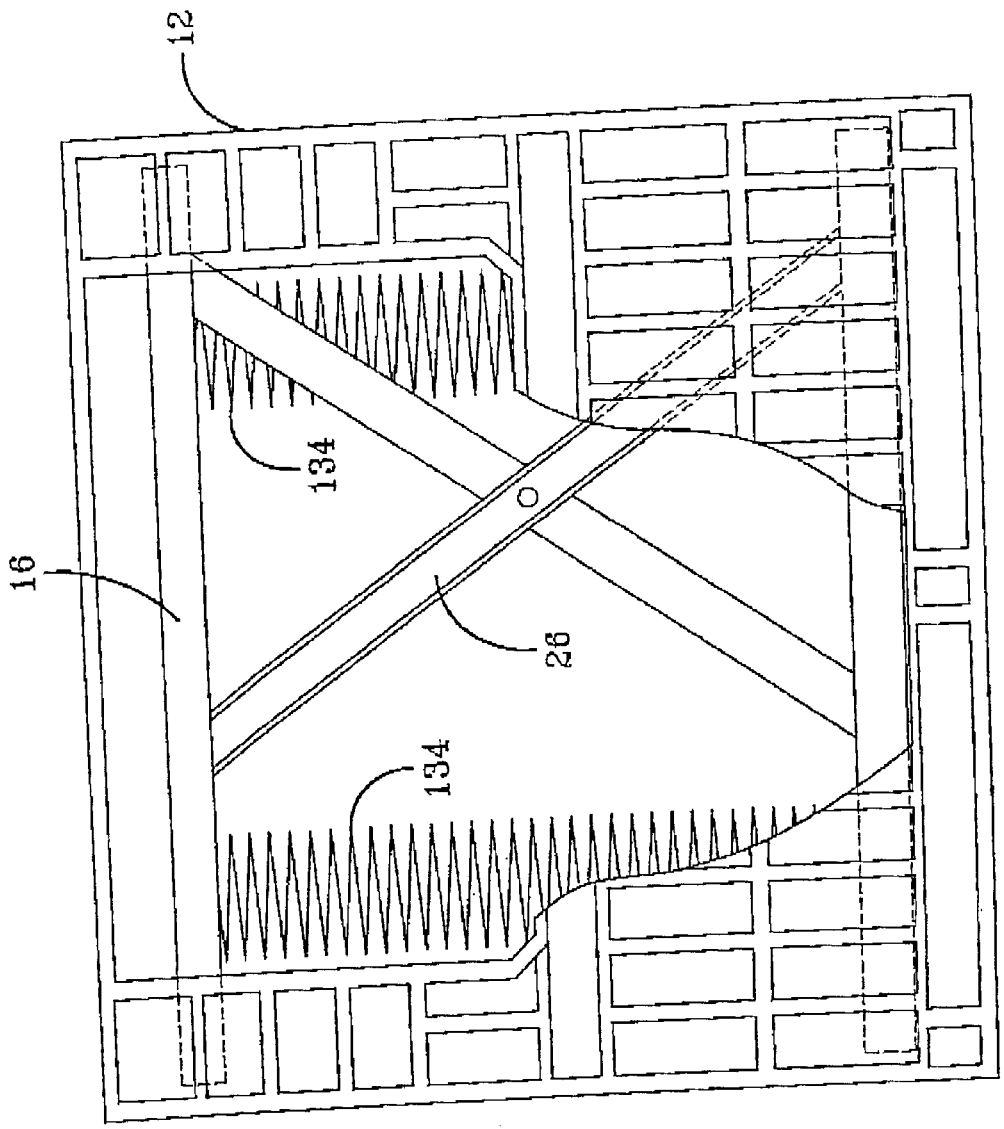
FIG. 6 is a cut-away front view of a bin according to the present invention.
Figure 7:
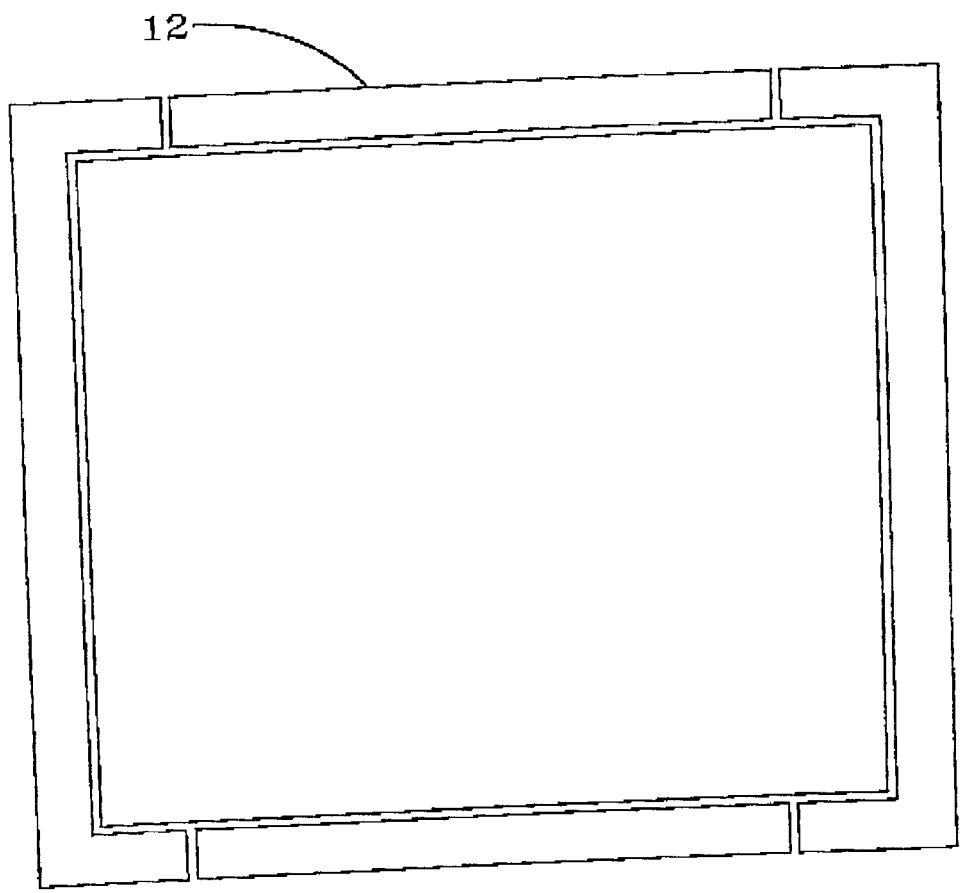
FIG. 7 is a cut-away top front view of the bin of FIG. 6 of the present invention.

FIGS. 5–7 show a fifth embodiment 130 of the present invention. The fifth embodiment 130 is, essentially, the same as the devices of FIGS. 2 and 4 with a different type of lifting mechanism. The lifting mechanism 26 of FIGS. 5–7 is a calibrated spring 134. The spring 134 must be calibrated for the type of part placed on platform 16 of the parts bin 12, so that the vertical position of the parts is always at the vertical position that minimizes the bending required of an operator when removing parts from, or adding parts to, the parts bin 12.

Figure 8:
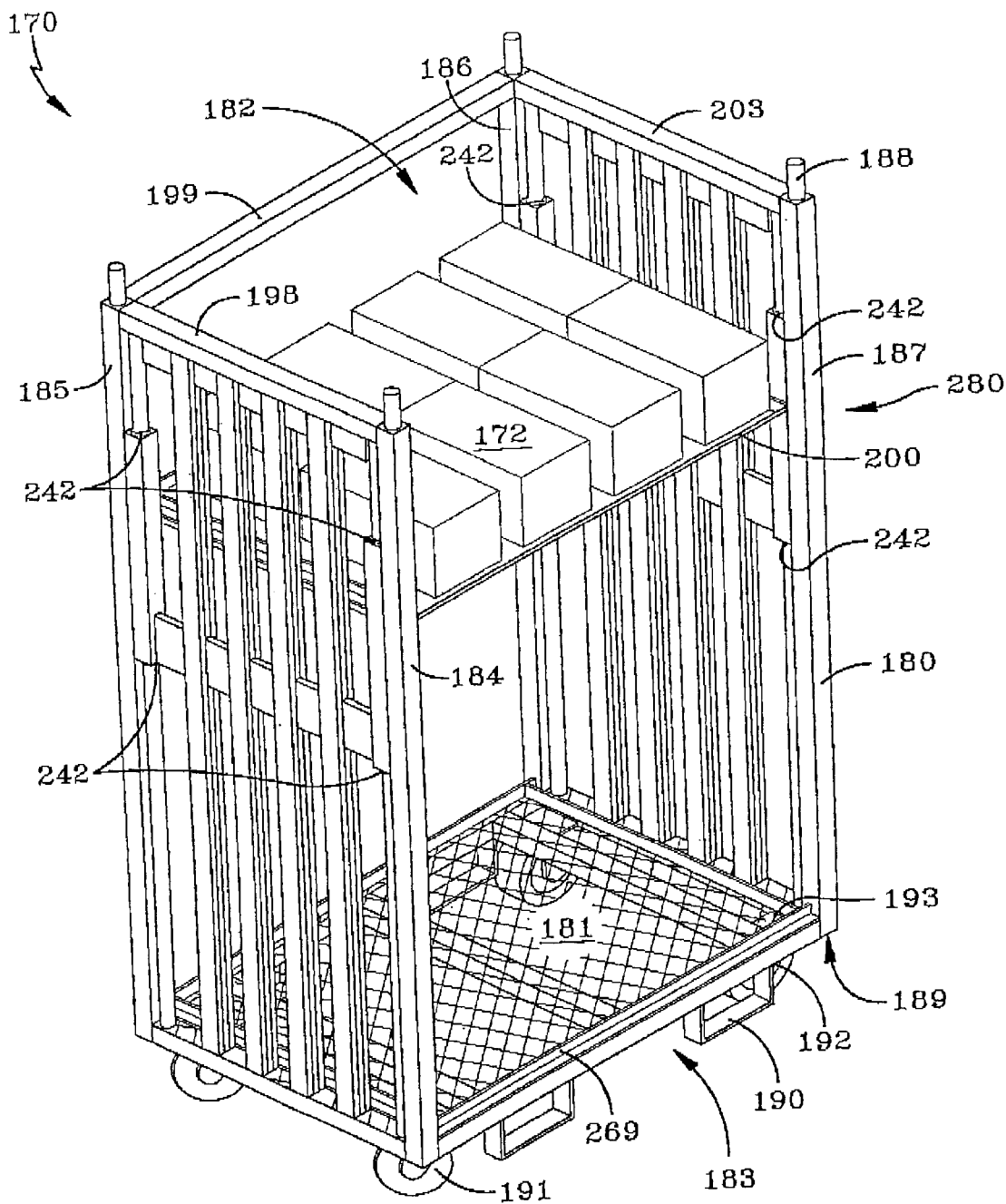
FIG. 8 is a perspective front view of a sixth embodiment of the present invention shown holding parts.
Figure 9:
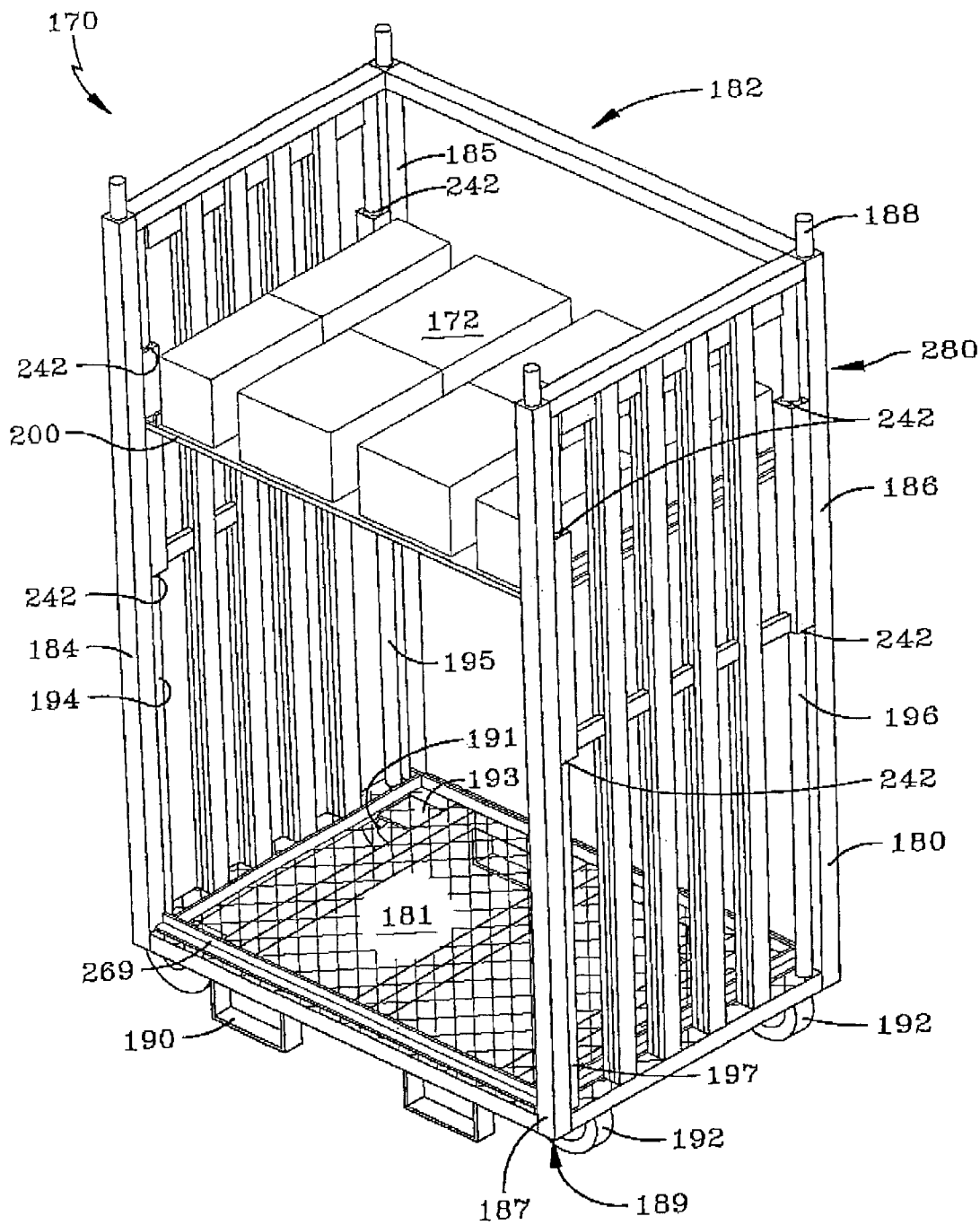
FIG. 9 is a perspective side view of the sixth embodiment shown holding parts.
Figure 10:
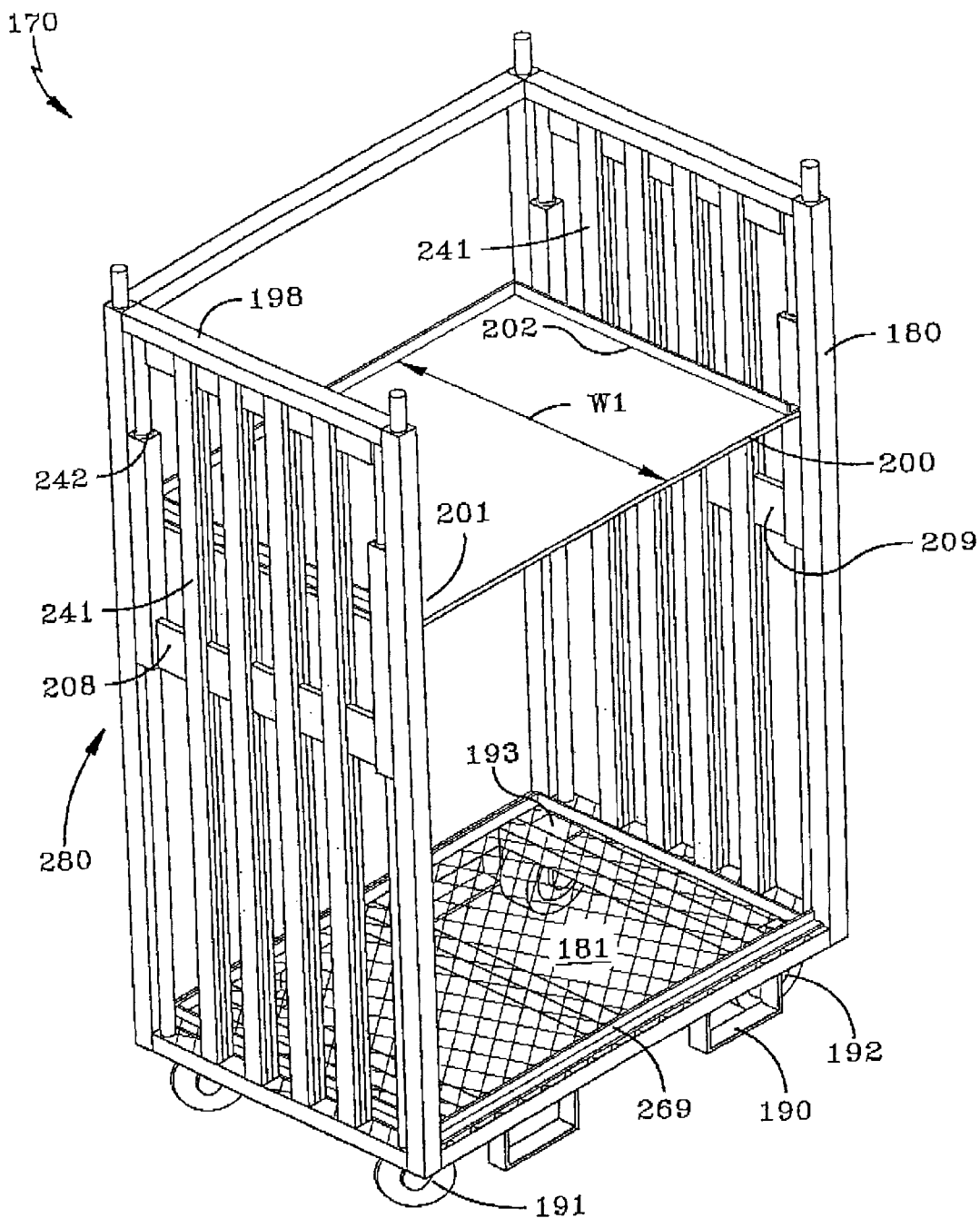
FIG. 10 is a perspective front view of the sixth embodiment shown without parts.

In a sixth embodiment of this invention, FIGS. 8–12 show an ergonomic platform truck 170 which has a bin 180 and a platform assembly 280 which includes platform 200. The bin 180, in this embodiment, is a box shown best in FIG. 8, with a base 181, a top 182 and a front 183. The top 182, in this embodiment, is formed of three cross members 198, 199, 203. Both the top and front 182, 183 are open. By open it is meant that there is no portion of the ergonomic platform truck 170 which would impede the placement or removal of parts 172 from the top or front 182, 183. Rigidly attached to the base 181 and shown best in FIGS. 8–9, is side framing 269 and four columns, 184, 185, 186, 187 which are vertically disposed. The ergonomic platform trucks 170 of this invention are stackable. By stackable it is meant that platform trucks, which could include any number of ergonomic platform trucks 170, can be stacked on top of each other for storage or other purposes. In this embodiment stacking pins 188 are used but it should be noted that any means chosen with sound engineering judgement such as equipping the four columns 184, 185, 186, 187 with joinable angle iron could also be used. The stacking pins 188 are mounted to the top while stacking slots 189 are formed in the bottom of each column 184, 185, 186, 187. The stacking slots 189 are made to receive the stacking pins (similar to 188) of another associated platform truck (not shown).

With reference to FIGS. 8–11, forklift brackets 190 for receiving the forks of an associated forklift (not shown) are rigidly attached to the base 181. Also attached to the base 181 are casters. In this preferred embodiment, two casters 191 are swivelly mounted and two other casters 192 are rigidly mounted to the base 181 via caster mounting plates 193. Guide rods 194, 195, 196, 197 are vertically disposed on the bin 180 for reasons, which will be explained below.

Figure 11:
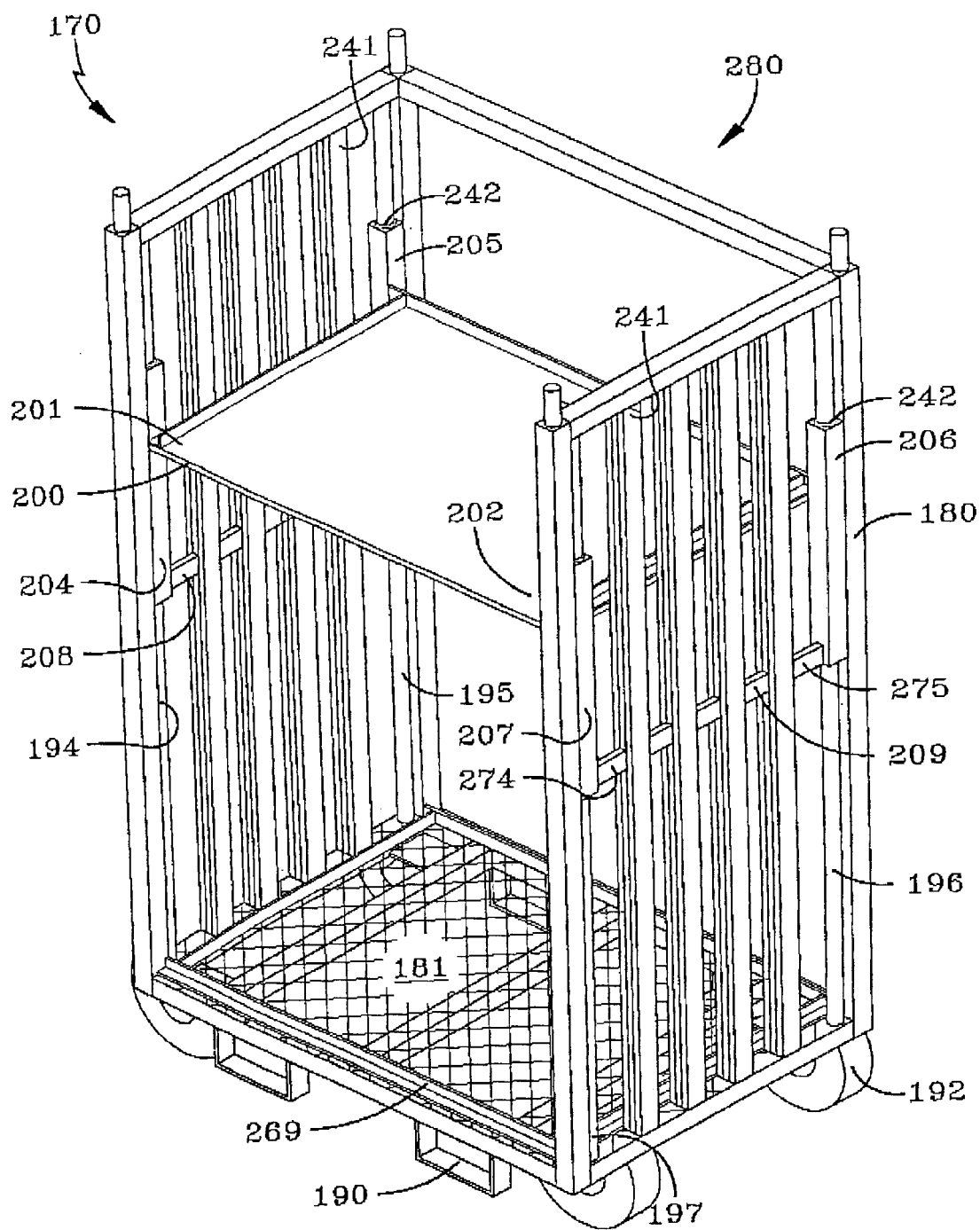
FIG. 11 is a perspective side view of the sixth embodiment shown without parts.

With reference now to FIGS. 10–11, 19–20, 26, platform assembly 280 is vertically moveable within the bin 180 and includes platform 200 which is generally horizontal and planar and is constructed so as to hold parts thereon, such as parts 172 (shown in FIGS. 8–9). It should be noted that the parts can be of any type used with sound engineering judgement. The platform assembly 280 has first and second sides 201, 202 having first and second spring support brackets 208, 209 respectively. The purpose of the spring support brackets 208, 209 will be explained below. The platform assembly 280 also has, as best seen in FIG. 11, deck guides 204, 205, 206, 207, which are vertically disposed. Within each deck guide 204, 205, 206, 207, at the top and bottom is a linear bearing 242. In this preferred embodiment each linear bearing 242 has a first end 250 with a lip portion 252 and a second end 251. Lip portions 252 remain external to deck guides 204, 205, 206, 207, while second ends 251 are received within deck guides 204, 205, 206, 207. The linear bearings 242 and thus the deck guides 204, 205, 206, 207 receive and are vertically moveable along the guide rods 194, 195, 196, 197 respectively. The linear bearings 242 assure that the platform assembly 280 moves smoothly along guide rods 194, 195, 196, 197 with no binding. The linear bearings 242 also eliminate any tipping factor. The deck guides 204, 205, are rigidly attached to the first side 201 of the platform assembly 280 while deck guides 206, 207 are likewise rigidly attached to the second side 202. Second spring support bracket 209 has first and second ends 274, 275 rigidly connected to deck guides 207, 206 respectively. First spring support bracket 208 is similarly rigidly connected to deck guides 204, 205. All rigid connections in this embodiment are welds but other connecting means chosen with sound engineering judgment would also be acceptable for this invention. Though the platform 200 can be customized to any required dimensions, it has been learned that to minimize the stress put on an operators back when lifting parts (172 in FIGS. 8–9), it is best to maintain the width W1 of the platform 200 under 30 inches (76.2 centimeters).

Figure 14:
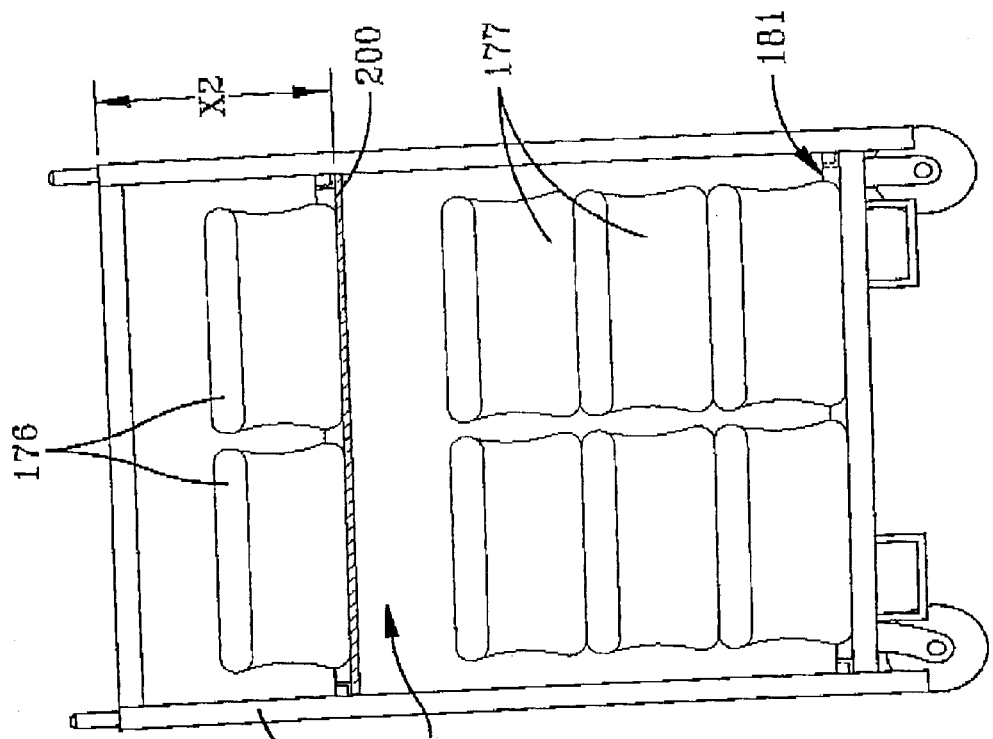
FIG. 14 is a front view of the ergonomic platform truck of FIG. 13 showing how the open storage space can be used to store empty parts containers.
Figure 13:
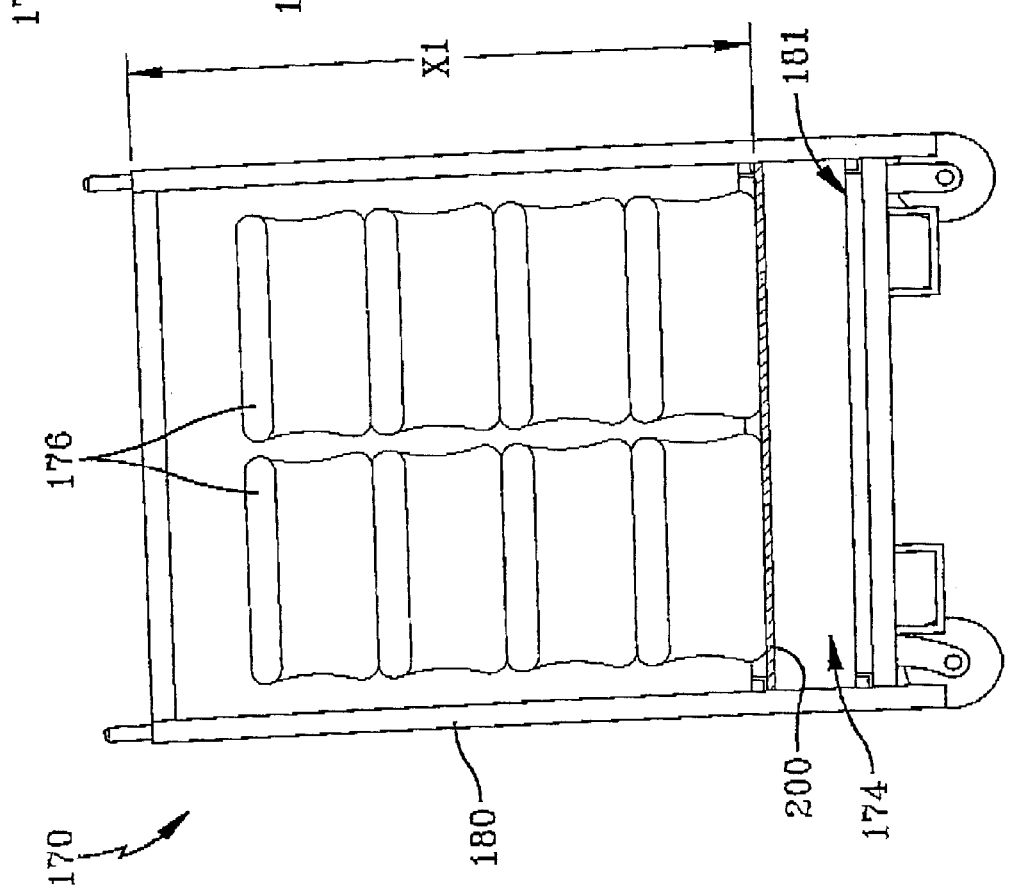
FIG. 13 is a front view of an ergonomic platform truck when it is fully loaded.
Figure 27:
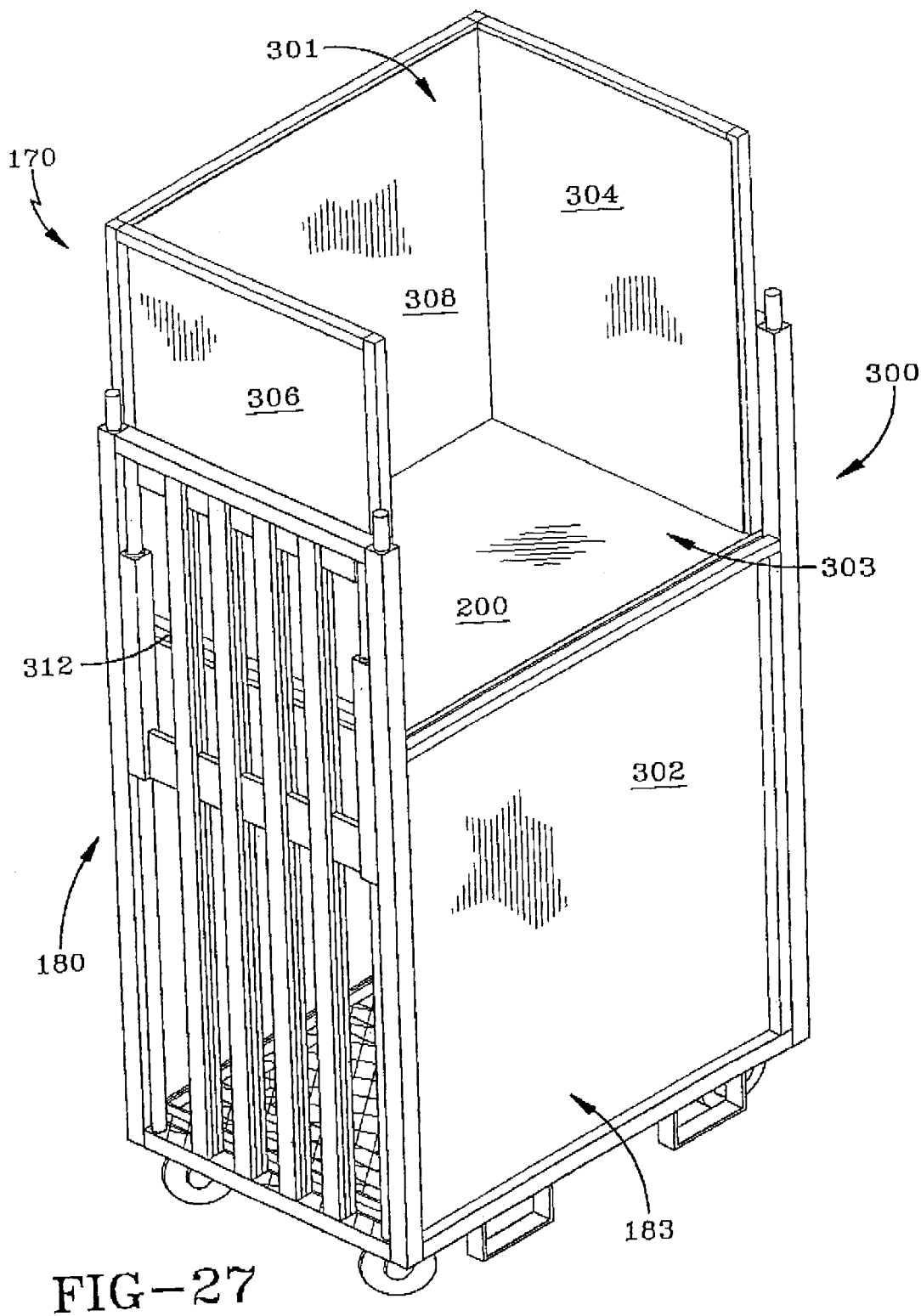
FIG. 27 is a perspective front view of an ergonomic platform truck having a bucket for use in holding loose parts.

With reference now to FIG. 8–9, 13–14 and 27, parts may be held on the platform 200 in various ways. As seen in FIGS. 8 and 9, sometimes the parts, such as parts 172, are sized and shaped such that they will remain on the platform 200 with no additional containing means. Other times, as seen in FIGS. 13 and 14, the parts are placed inside containers, such as laden containers 176. It may also be desirable to hold loose parts that are not sized or shaped to remain on the platform 200 without using containers. Thus, as seen in FIG. 27, the ergonomic platform truck 170 may be equipped with a bucket 300. The bucket 300 is ideal for use with parts that are spherical in shape such as golf balls (not shown). Of course the bucket 300 could be used with any parts chosen with sound engineering judgement. The bucket 300 is vertically disposed around the perimeter of the platform 200 and preferably includes first, second, third and fourth walls 302, 304, 306, 308. In this preferred embodiment first wall 302 is rigidly connected to the front 183 of the bin 180. Thus, in this case, the front 183 of the bin 180 is not open. Second, third and fourth walls 304, 306, 308, are rigidly connected to the left side 312 and right and back sides (not shown) of the platform 200. When the platform 200 is at it lowest point (not shown) the bucket 300 forms a box having a bottom (platform 200), four sides (first, second, third and fourth walls 302, 304, 306, 308) and a top 301 that is open. As the platform 200 is raised, the front 303 of the bucket 300 gradually opens. When the platform 200 reaches its maximum height, as shown in FIG. 27, the front 303 of the bucket 300 is completely open. Thus, the front 303 of bucket 300 is selectively open or closed depending on the vertical position of platform 200.

Figure 12:
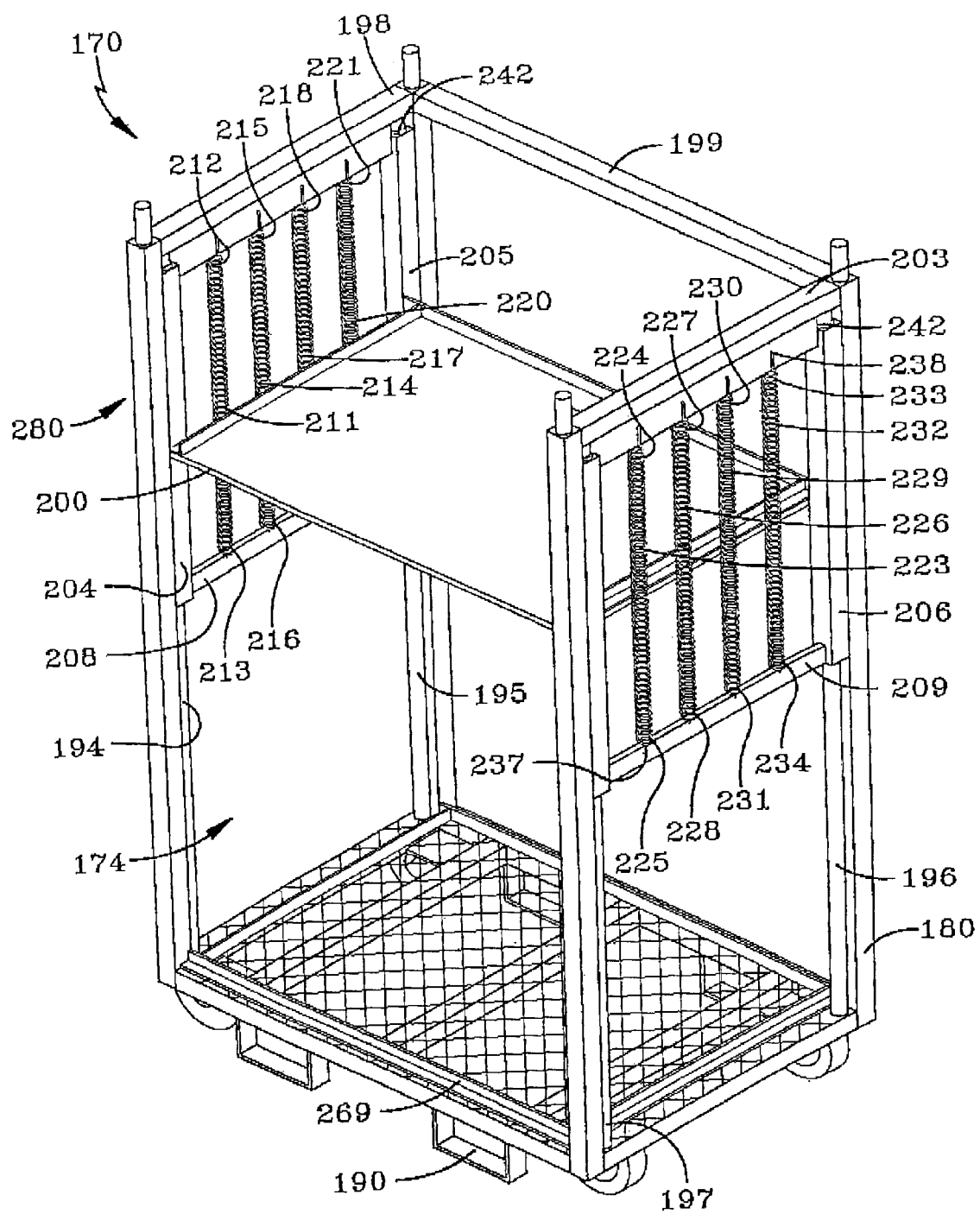
FIG. 12 is a perspective side view of the sixth embodiment showing the springs without spring covers.

With reference now to FIGS. 12–14, springs 211, 214, 217, 220, 223, 226, 229, 232 are used to lift platform assembly 280 within the bin 180. Springs 211, 214, 217, 220, 223, 226, 229, 232 are disposed to the side of and externally to the platform 200 so that they are not positioned either directly above or directly below the platform 200. For this reason, there is an open storage space 174 below the platform 200, which includes the entire space between the platform 200 and the base 181. The open storage space 174 could be used for storage or other uses. One efficient use of the open storage space 174 is for dunnage such as empty parts containers. In a typical application, shown in FIG. 13, the ergonomic platform truck 170 would come to the operator full of laden containers 176, which contain parts to be used, by the operator. The weight of the parts in the laden containers 176 hold the platform 200 at a level which is a distance X1 from the top of the ergonomic platform truck 170 so that the top most laden containers 176 are at the preferred height for the operator. As the laden containers 176 are emptied of their parts and removed, the weight on the platform 200 is lessened and the springs 211, 214, 217, 220, 223, 226, 229, 232 raise platform 200 so that it maintains the preferred height for the operator. As the platform 200 raises, open storage space 174 grows larger. Thus, it can be easily understood that open storage space 174 is an ideal place to store emptied containers 177 because just as emptied containers 177 become available, additional open storage space 174 also becomes available. FIG. 14 shows the ergonomic platform truck 170 holding laden containers 176 on its platform 200 and holding emptied containers 177 in its open storage space 174. It should be noted that the platform 200 is now at a distance X2 (where X2 is significantly smaller than X1) from the top of the ergonomic platform truck 170 so that the laden containers 176 continue to be at the preferred height for the operator.

With reference to FIGS. 15–16, another way to store emptied containers 177 is by mounting a storage assembly 178 to the side of the ergonomic platform truck 210 thus providing an open storage space 179. This storage assembly 178 can be made in any manner and of any material chosen with sound engineering judgement but in this embodiment it is made of steel members 175 fixedly attached to the bin 286. Of course a storage assembly 178 could just as easily be mounted to the other side, both sides, or the back of the ergonomic platform truck 210 as well. FIG. 16 shows the ergonomic platform truck 210 holding laden containers 176 on its platform 200 and holding emptied containers 177 in its open storage space 179. It may also be desirable to cover the storage assembly 178 with a cover 239 as shown in FIG. 15.

Figure 17:
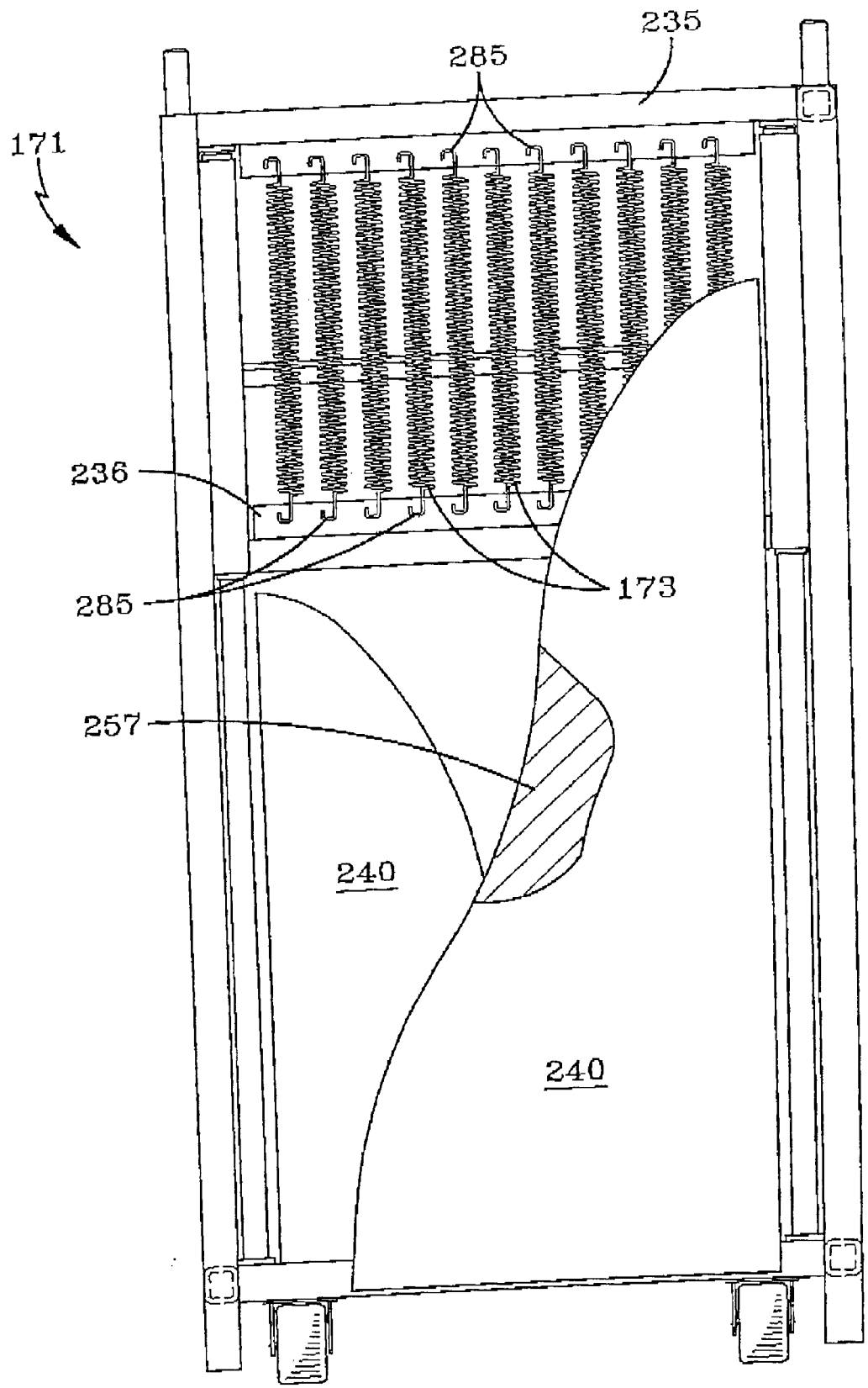
FIG. 17 is a side view of an ergonomic platform truck showing spring slots and spring covers.
Figure 21:
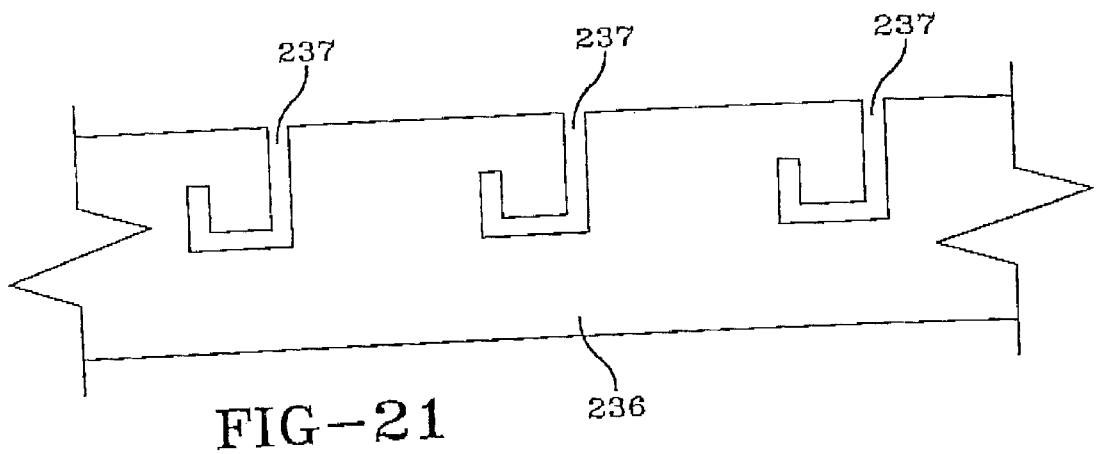
FIG. 21 is a side cut-a-way close-up view of a spring support bracket showing spring slots.
Figure 22:
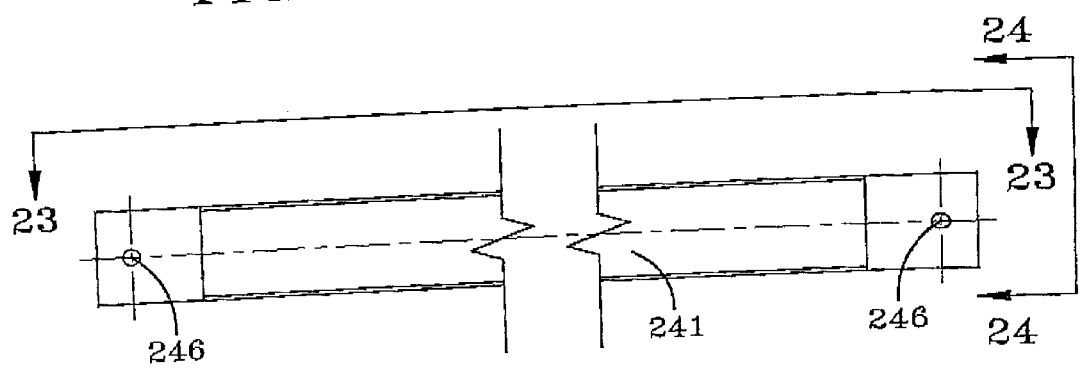
FIG. 22 is a bottom cut-a-way view of a spring cover used in this invention.
Figure 23:
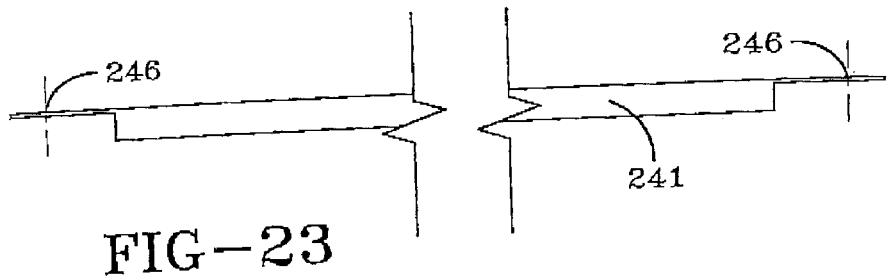
FIG. 23 is a side cut-a-way view taken along the line 23—23 of FIG. 22.

With reference now to FIGS. 12, 17, 21, 26, springs 223, 226, 229, 232 have second ends 225, 228, 231, 234 respectively, operatively connected to the second spring support bracket 209 and first ends 224, 227, 230, 233 respectively, operatively connected to the cross member 203 directly above the second spring support bracket 209. The connection to the second spring support bracket 209 and the cross member 203 can be of any type chosen with sound engineering judgement but in this embodiment is by means of holes 237, 238 respectively. Similarly, springs 211, 214, 217, 220 have second ends 213, 216 (second ends of springs 217, 220 not visible) respectively, operatively connected to the first spring support bracket 208 and first ends 212, 215, 218, 221 respectively, operatively connected to the cross member 198 directly above the first spring support bracket 208. FIG. 17 shows another but similar embodiment wherein the ergonomic platform truck 171 has springs 173 which are connected to cross member 235 and spring support bracket 236 by means of spring slots 285. The spring slots 285 are best seen in FIG. 21. Whether connected by holes 237, 238, by spring slots 285, or by other means, it is desirable to be able to selectively connect and disconnect individual springs 223, 226, 229, 232 or 173. In this way the overall spring strength can be adjusted to suit the need, i.e., to suit the weight of the parts to be placed on ergonomic platform truck 170 or 171. An efficient way to disengage a spring is to disconnect the second end 225 of spring 223, for example, from the second spring support bracket 209 while allowing the first end 224 to remain connected to cross member 203. In this way the spring 223 remains in place and can be reconnected to the second spring support bracket 209 when ever it is desirable to increase the overall spring strength.

With reference again to FIG. 12, springs 211, 214, 217, 220 are similarly operatively connected to the first spring support bracket 208 and the cross member 198 directly above the first spring support bracket 208. The springs 211, 214, 217, 220, 223, 226, 229, 232 which provide lifting means for the platform 200 so that it can move vertically along the guide rods 194, 195, 196, 197, can be of any type chosen with sound engineering judgement but in this embodiment are extension springs having spring constants chosen and matched to the weight of the parts 172 (shown in FIGS. 8 and 9). It should be noted that while eight springs were used in this embodiment, the exact number can and should be modified to best suit the engineering requirement.

Figure 24:
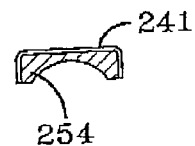
FIG. 24 is an end view taken along the line 24—24 of FIG. 22 showing the channel shape of the spring cover and the foam panel used to protect the springs.
Figure 25:
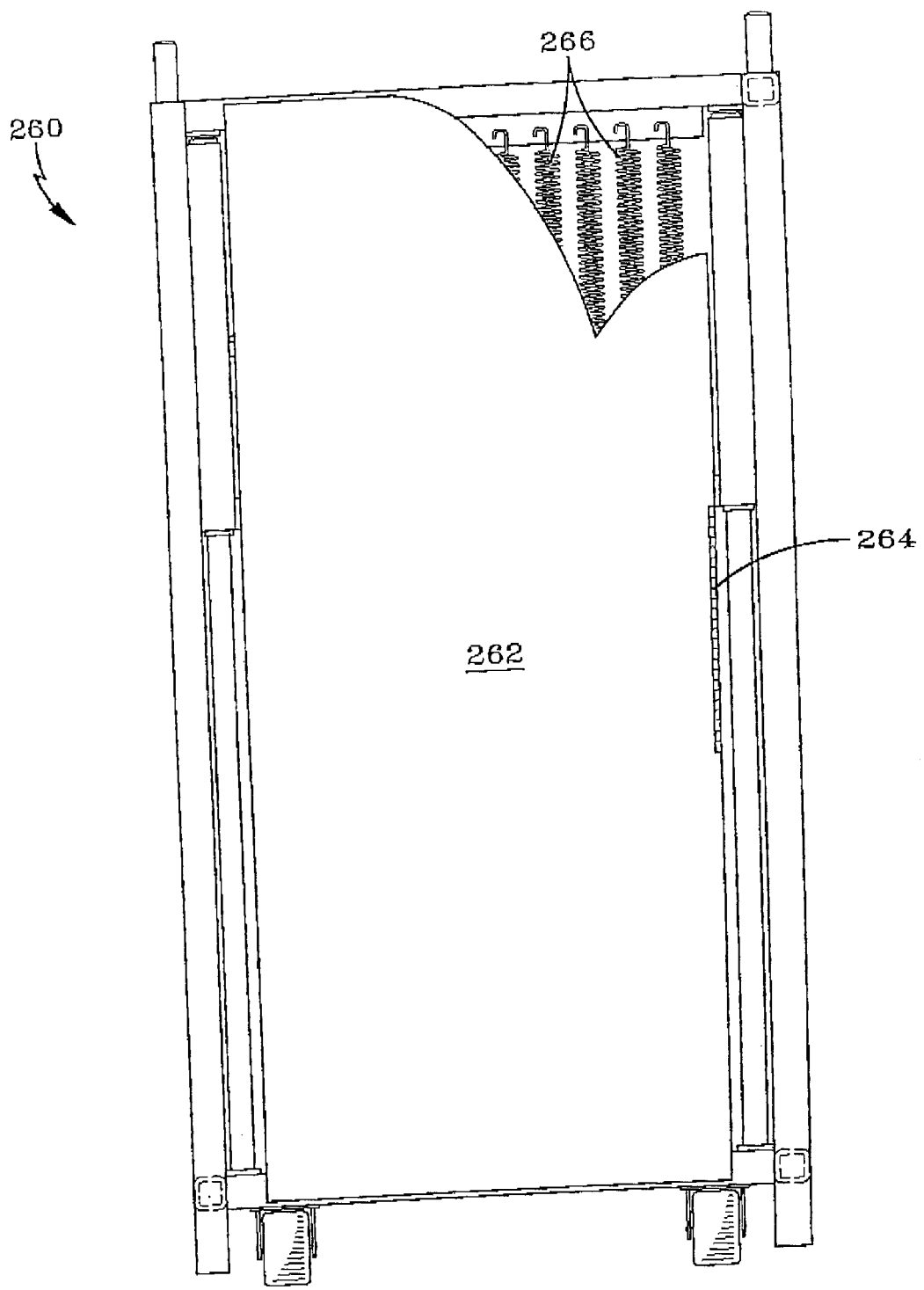
FIG. 25 is a side view of an ergonomic platform truck showing a door, which covers the springs.
Figure 26:
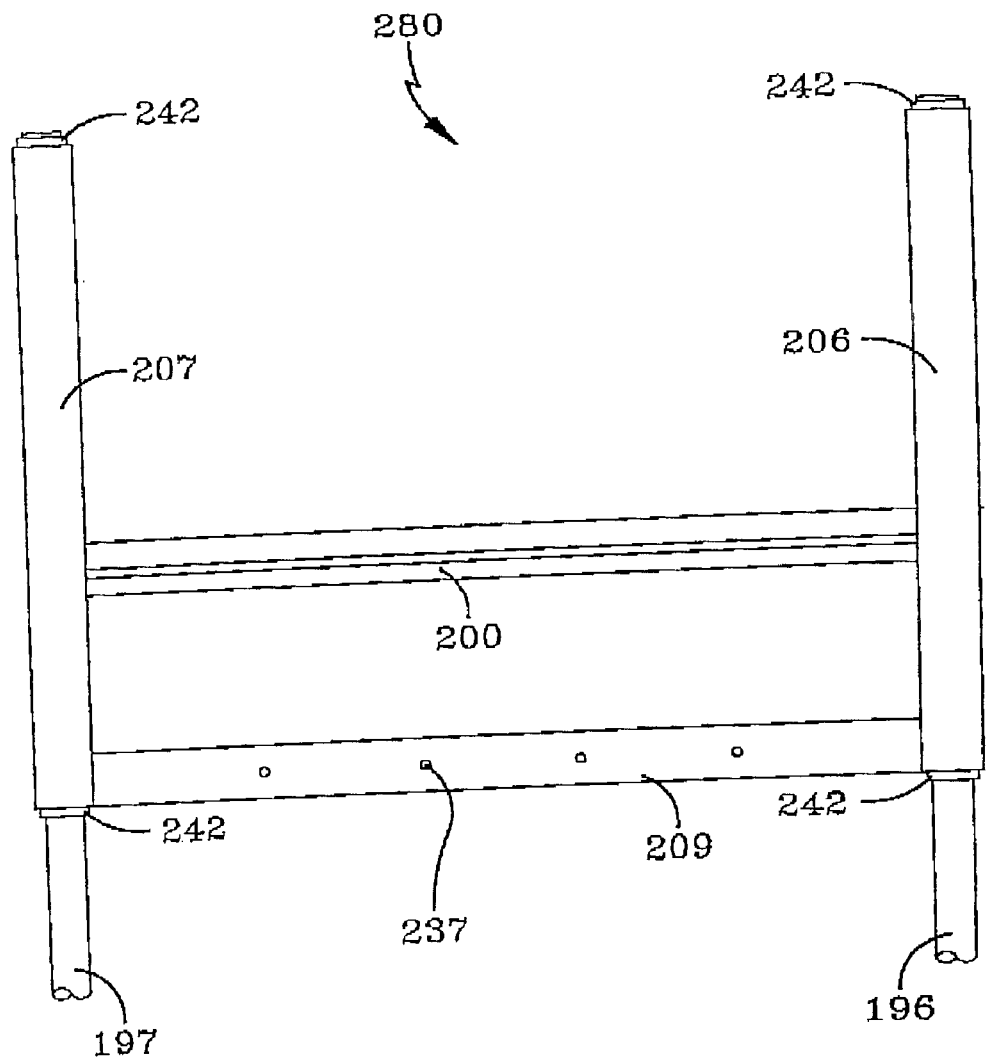
FIG. 26 is a side view of the platform assembly used in this invention.

With reference now to FIGS. 10–11, 17, 22–24, each spring (shown as 211, 214, 217, 220, 223, 226, 229, 232 in FIG. 12) is individually covered on the inside and on the outside by spring covers 241. In this embodiment spring covers 241 are channel-shaped and have openings 246 whereby screws (not shown) are used to attach the spring covers to the bin 180. Of course other shapes and attaching means chosen with sound engineering judgement are also possible. It may also be desirable, as shown in FIG. 24, to use spring protecting means such as foam panels 254 to protect the springs. It should be noted that the panels 254 not only protect the springs but they also provide sound protection means whereby the sound generated by the springs as they are extended and contracted is absorbed and therefore largely dissipated before it reaches the ears of any nearby person. In the preferred embodiment the panels 254 are formed of foam for sound protection purposes. However, the panels can be formed of any sound absorbing material chosen with sound engineering judgment. The spring covers 241 do not fully surround the springs (shown as 211, 214, 217, 220, 223, 226, 229, 232 in FIG. 12) because first and second spring support brackets 208, 209 move between them as the platform assembly 280 is moved vertically. In an alternate embodiment, shown in FIG. 17, all the springs 173 on one side of ergonomic platform truck 171 are jointly covered on the inside and on the outside by spring covers 240. Once again it may be desirable to use spring protecting means such as foam panels 257 positioned within spring covers 240 to protect the springs 173 and to provide sound protection means. In an alternate design, shown in FIG. 25, an ergonomic platform truck 260 may utilize a door 262 that swings on a hinge 264 and performs the duty of a spring cover. Doors 262 make springs 266 very accessible for adjustment or maintenance.

Figure 18:
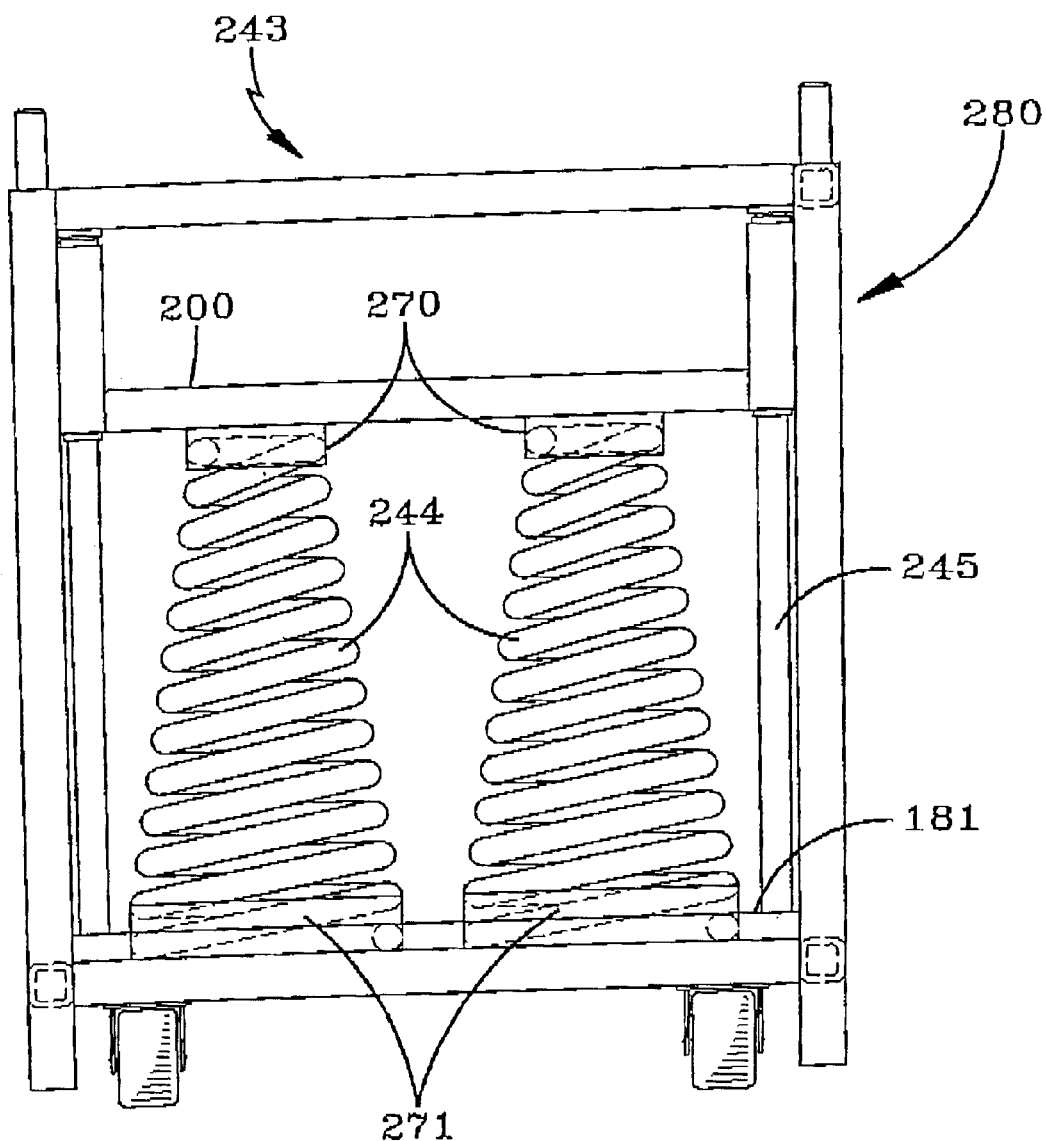
FIG. 18 is a side view of an ergonomic platform truck, which uses conical springs to lift the platform assembly.
Figure 19:
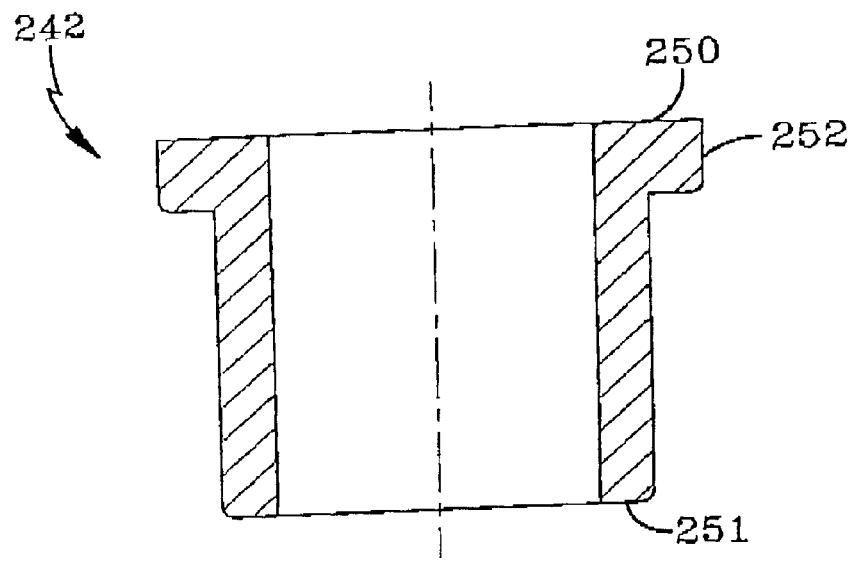
FIG. 19 is a sectional view taken along the line 19—19 of FIG. 20 showing the lip portion of the linear bearing.
Figure 20:
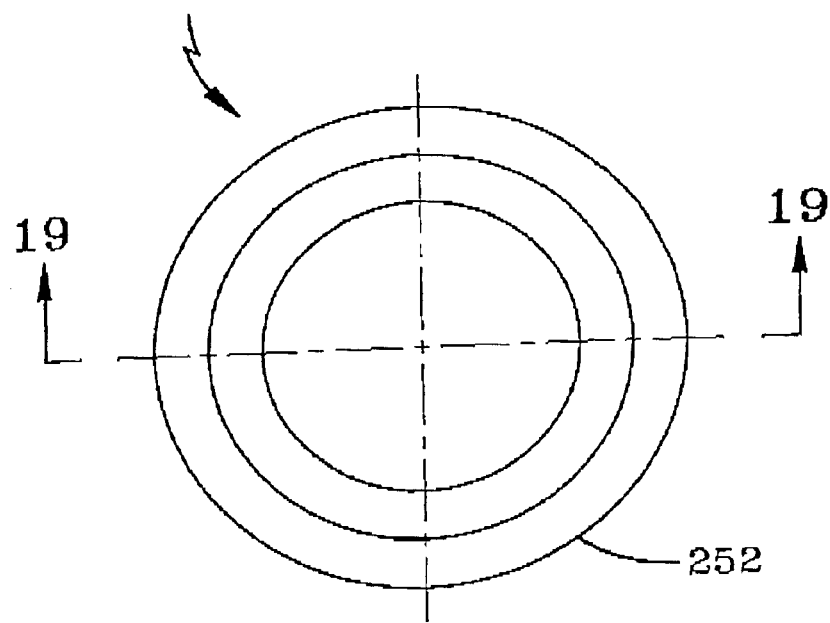
FIG. 20 is an end view of the linear bearing used in this invention.

With reference now to FIG. 18, an ergonomic platform truck 243 is shown having conical springs 244 to lift platform assembly 280. The conical springs 244 are operatively connected at one end to the bottom of platform 200 within upper clam shells 270 and at the other end to the base 181 within lower clam shells 271. The conical springs 244, which provide lifting means for the platform assembly 280 so that it can move vertically along the guide rods 245, can be of any type commercially available chosen with sound engineering judgment having spring constants matched to the weight of the parts. It should be noted that while two springs were used in this embodiment, the exact number can and should be modified to best suit the engineering requirement.

All of the embodiments of the present invention can be stationary or portable. All of the embodiments of the present invention can be constructed to fit any size parts bin 12, or can be a stand-alone unit, and vertically adjust to any type (e.g., size, weight, etc.) of part.

The materials used to construct the present invention may be strong, lightweight, long lasting, economic, and ergonomic. For example, polyethylene (which will not rust, mildew or deteriorate, is easy to clean, and is impervious to moisture, oils, and most chemical agents) may be used.

Figure 28:
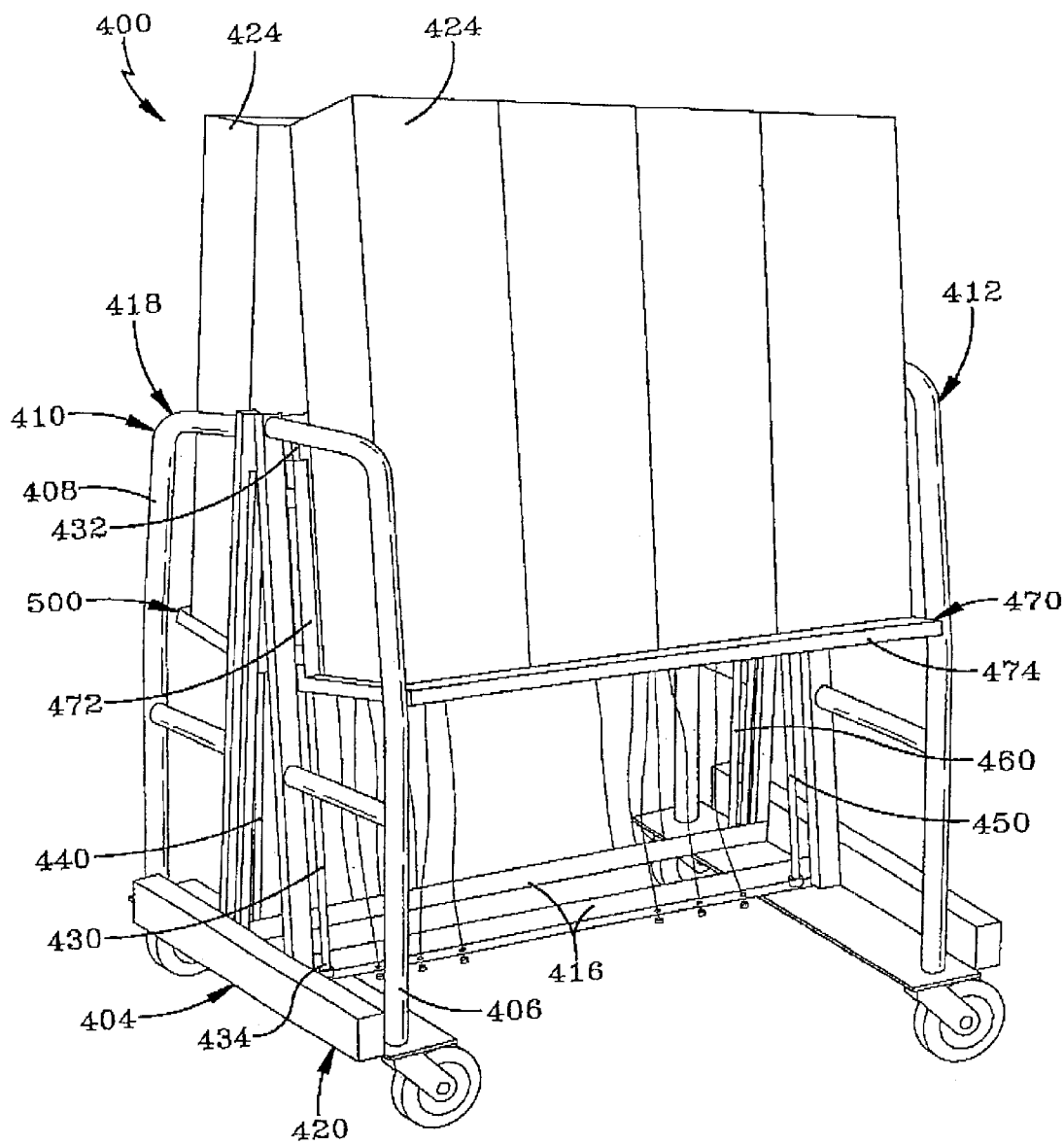
FIG. 28 is side perspective view of another embodiment, a dual platform truck having a pair of platform assemblies mounted to one frame.
Figure 29:
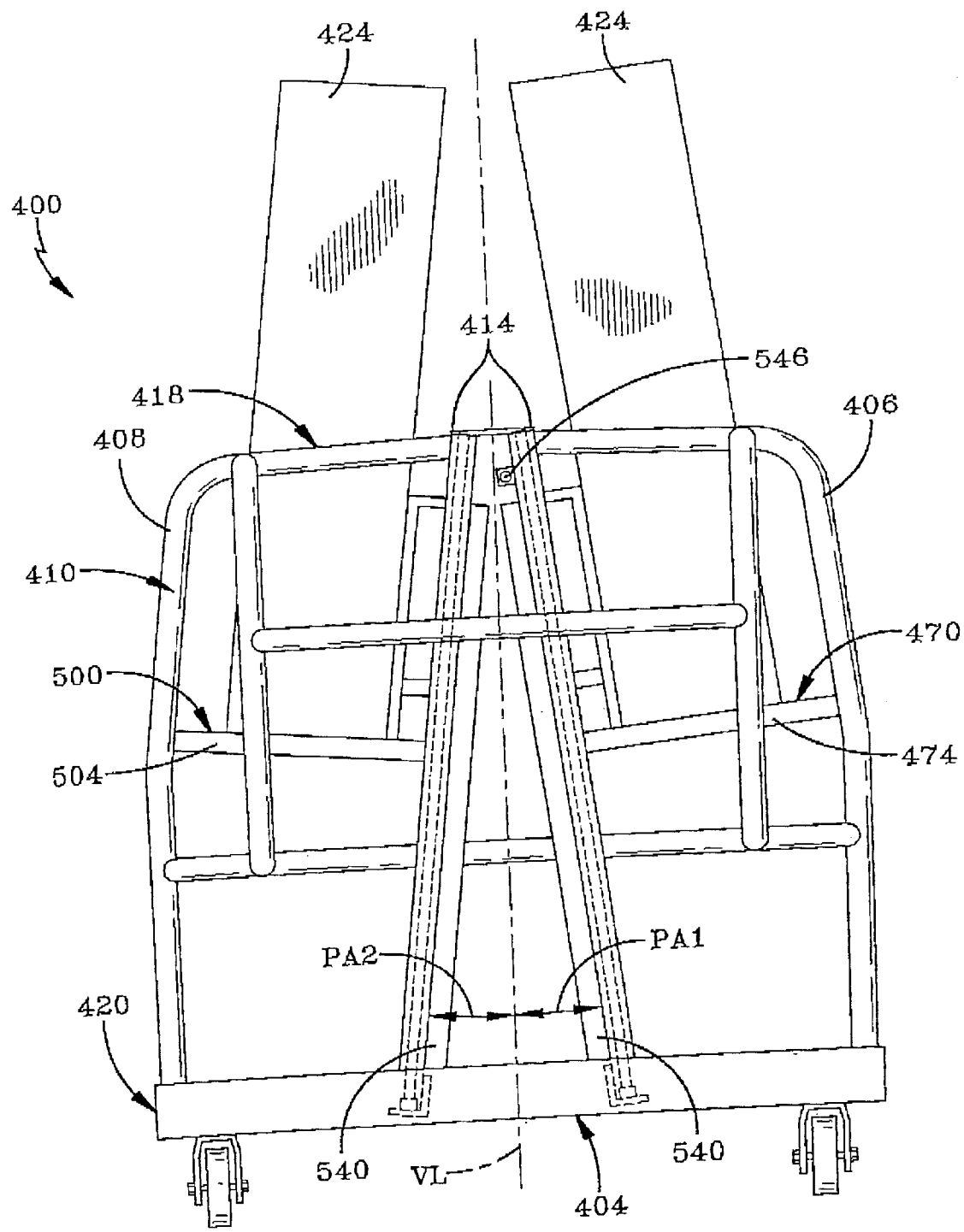
FIG. 29 is an end view of the dual platform truck of FIG. 28 showing the guide rods positioned at a pitch angle with respect to a vertical line.

With reference now to FIGS. 28–31, in another embodiment, a dual platform truck 400 is shown. In FIGS. 28–29 it is shown holding associated items 424 that can be of any type chosen with sound engineering judgment. The dual platform truck 400 includes a frame assembly 404 having first and second sides 406, 408 and first and second ends 410, 412. Preferably, at least at each quadrant the frame assembly 404 also includes first and second segments 414, 416. In the embodiment shown, each side of the frame assembly has first and second segments 414, 416 that extend from the first end 410 to the second end 412. The first and second segments 414, 416 may form the top and bottom 418, 420 respectively of the frame assembly 404 as shown or alternatively, the first and second segments 414, 416 may be positioned at any location chosen with sound engineering judgement. Thus, it should be clear that the segments 414, 416 may be position between the top and bottom 418, 420 of the frame assembly 404.

Figure 30:
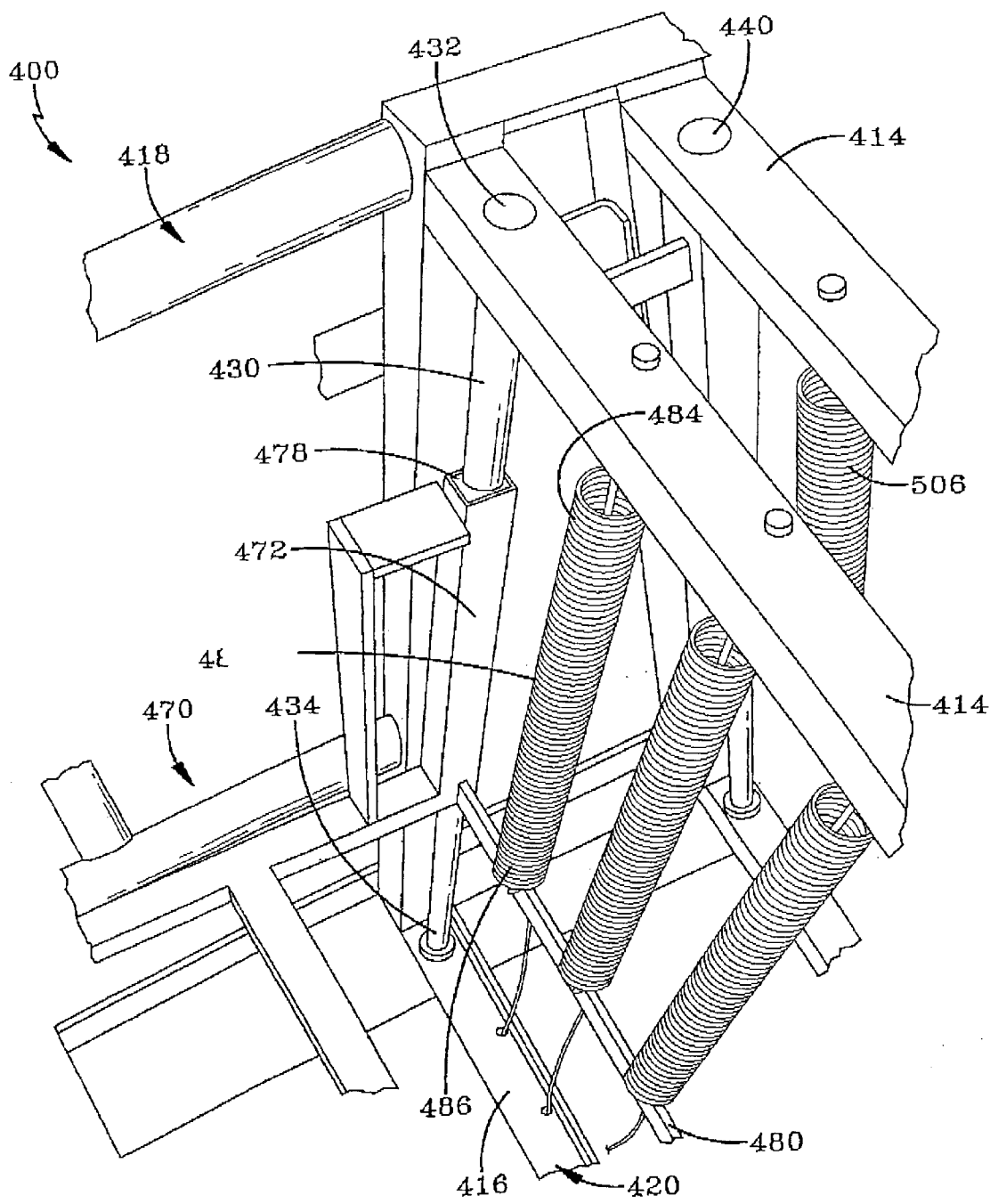
FIG. 30 is top partial perspective view of the dual platform truck of FIG. 28 showing the first deck guide receiving the first guide rod.

With reference now to FIGS. 28 and 30, a first guide rod 430 has a first end 432 operatively connected to the first segment 414 on the first end 410 of the first side 406 of the frame assembly 404 and a second end 434 operatively connected to the second segment 416 on the first end 410 of the first side 406 of the frame assembly 404. Preferably, the guide rod 430 is fixedly connected to the segments 414, 416. Second, third and fourth guide rods 440, 450, 460 are similarly positioned on the first end 410 second side 408, second end 412 first side 406 and second end 412 second side 408 respectively.

Figure 31:
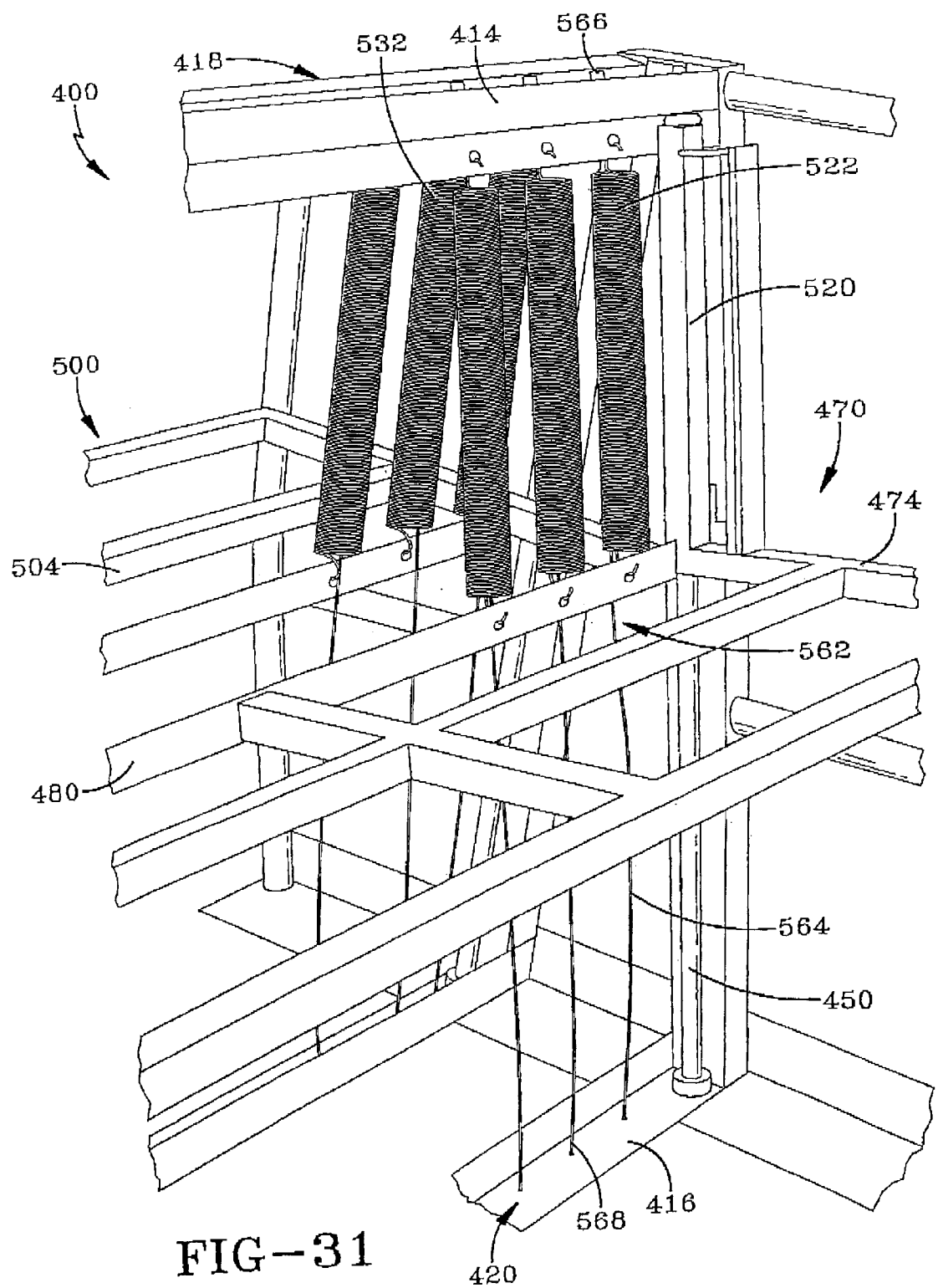
FIG. 31 is an end partial perspective view of the dual platform truck of FIG. 28 showing the third deck guide receiving the third guide rod and showing the first platform assembly.

With reference to FIGS. 28–31, the dual platform truck 400 includes first and second platform assemblies 470, 500 each preferably including a cantilevered platform. It should be noted, however, that only a single platform assembly is required and would be similar to the platform truck 170 shown in FIGS. 8–12 and discussed above. The first platform assembly 470 is selectively movable along the first guide rod 430 and includes a first deck guide 472 that receives the first guide rod 430 and a first platform 474 that is preferably fixed to the first deck guide 472. The platform 474 may be continuously planer in shape (as is the platform 200 shown in FIG. 10) or may consist of generally planar but with openings as shown in FIG. 31. In either case, the platform 474 is constructed so as to hold items (shown as 424) thereon. These items can be of any type chosen with sound engineering judgment.

Still referring to FIGS. 28–31, within the first deck guide 472 at least a first linear bearing (not visible) is positioned and receives the first guide rod 430. The linear bearing 478 is preferably similar to the linear bearing 242 described above. Most preferably, two linear bearings are positioned within the deck guide 472, at the top and bottom of the deck guide 472. A first spring bracket 480 is fixedly connected to the first deck guide 472 for purposes to be discussed below. A first spring 482 is used to lift the first platform assembly 470 along the first guide rod 430. The first spring 482 has a first end 484 that is operatively connected to the first segment 414 and a second end 486 that is operatively connected to the first spring support bracket 480 as shown. Of course additional springs may be used as shown to provide the required spring strength for the platform truck 400.

Still referring to FIGS. 28–31, the second platform assembly 500 includes a second deck guide (not visible but similar in construction to the first deck guide 472 and third deck guide 520) and a second platform 504 and is constructed similar to the first platform assembly 470. A second spring 506 is used to selectively lift the second platform assembly 500 along the second guide rod 440. It should be noted that a single guide rod may be sufficient for each platform assembly. The single guide rod may be positioned on the frame assembly 404 half way between the ends of the platform, for example. In the embodiment shown, however, each platform assembly uses two guide rods. Thus, the third guide rod 450 is positioned opposite the first guide rod 430 on the second end 412, first side 406 of the frame assembly 404. A third deck guide 520 is similar in construction to the first deck guide 472 and is also fixedly connected to the first platform 474. A third spring 522 assists the first spring 482 in lifting the first platform assembly 470. (As noted above, additional springs as shown can also be used.) Similarly, the fourth guide rod 460 is positioned opposite the second guide rod 440 on the second end 412, second side 408 of the frame assembly 404. A fourth deck (not visible but similar in construction to the first deck guide 472 and third deck guide 520); a similar in construction to the second deck guide 502 and is also fixedly connected to the second platform 504. A fourth spring 532 assists the second spring 506 in lifting the second platform assembly 500. Again, additional springs may also be used.

Figure 32:
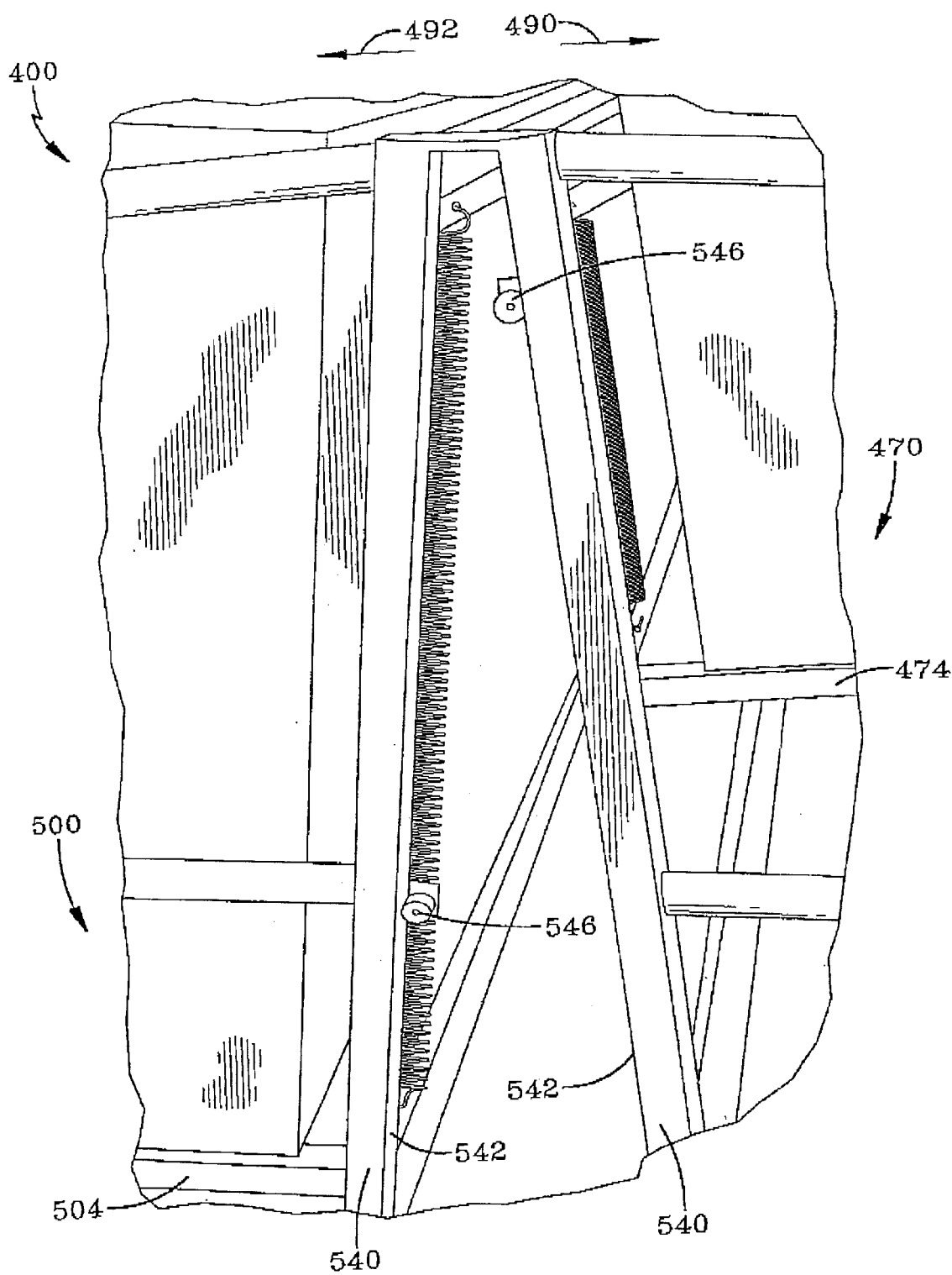
FIG. 32 is partial side perspective view of a dual platform truck showing cam rollers rolling along the roller surfaces of a pair of roller guides.
Figure 33:
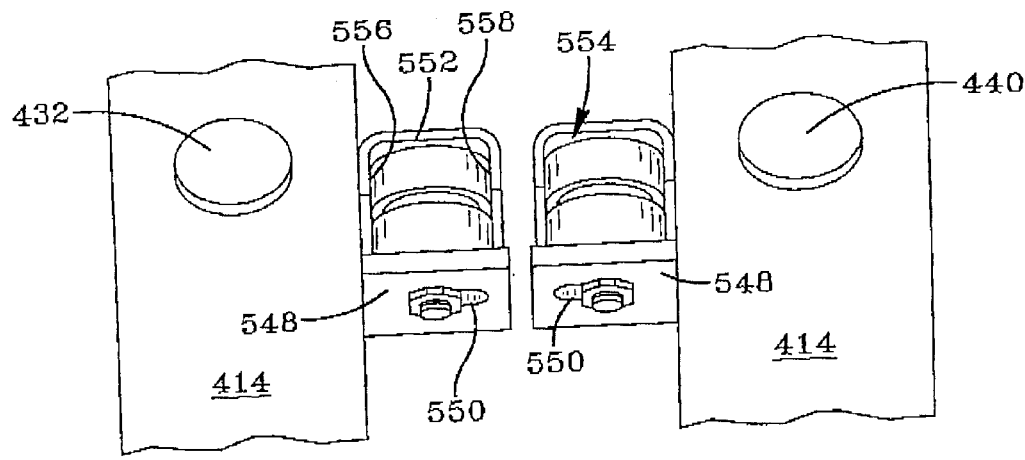
FIG. 33 is top partial view of the dual platform truck of FIG. 30 showing the cam rollers received within channels.
Figure 34:
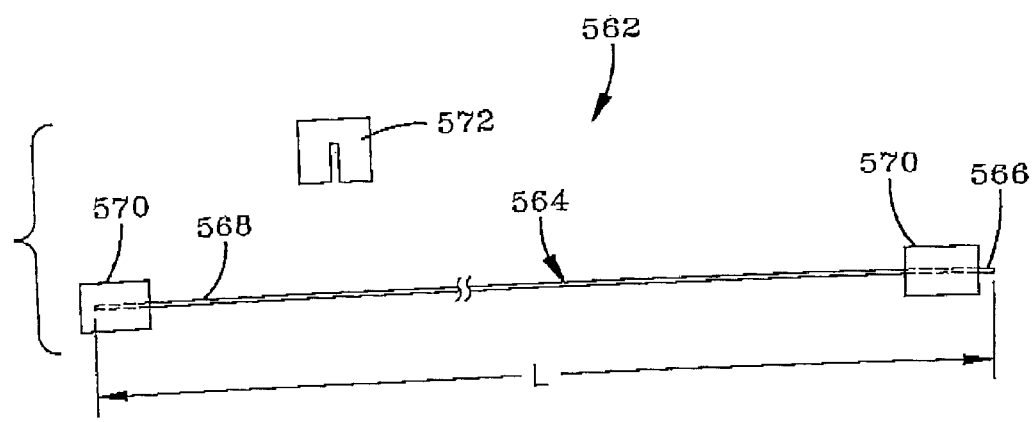
FIG. 34 is a schematic view of a spring restraint cable with a pair of stop sleeves and a secure plate.

With reference now to FIGS. 28 and 32–33, when very heavy loads are placed on the cantilevered platform assemblies 470, 500 the guide rods 430, 440, 450, 460 may be exposed to excessive bending loads that tend to bow them. To counteract this bending load additional guide rods could be added to the platform assembly. However, a lighter and less expensive method to counteract this bending load is to use cam followers as will now be described. A roller guide 540 is positioned on the frame assembly 404 preferably near each guide rod. Thus, four roller guides 540 are shown. Each roller guide 540 includes a roller surface 542. A cam roller 546 is rotatably connected to each deck guide 430, 440, 450, 460. A cam extension bracket 548, for example, may extend from each deck guide about which each cam roller 546 may selectively rotate. It should be noted that the extension bracket 548 preferably includes a slot 550 through which the cam roller 546 is attached. This slot 550 provides adjustment so that the cam roller 546 can be properly position relative to the roller guide 540. Thus, as the platform assemblies 470, 500 are moved along their guide rods, the cam rollers 546 roll along the roller surfaces 542 of the roller guides 540. In this way, the bending load is distributed not only through the linear bearings 478 within the deck guides 472 but also through the cam rollers 546 to the roller guides 540. If the bending load is great, each deck guide 472 may have two cam rollers 546, preferably at opposite ends of the deck guide 472, to help in distributing the bending load to the roller guide 540. In this case, as shown, each cam roller 546 attached to a single deck guide 472 preferably contacts the roller surface 542 of the same roller guide 540. Preferably, while the platform 474 extends from the first deck guide 472 generally in a first direction 490, the roller surface 542 faces generally in a second direction 492 that is substantially opposite to said first direction 490.

With continuing reference to FIGS. 28 and 32–33, to again assist in distributing loads, it may be desirable to form an alternate roller guide 552 that has a channel 554 defining first and second roller surfaces 556, 558 therewithin. In this case, as the platform assembly 470 is moved along the guide rods 430, 450, the cam roller 546 rolls along the first or second roller surface 556, 558 depending on the particular load applied to the platform 474.

With reference now to FIG. 28 and 29, it should be noted that either or both platform assemblies 470, 500 may be positioned at a pitch angle with respect to a vertical line VL. As shown, the first and third guide rods 430, 450 are substantially parallel and are positioned at a first pitch angle PA1 with respect to the vertical line VL. Similarly, the second and fourth guide rods 440, 460 are substantially parallel and are positioned at a second pitch angle PA2 with respect to the vertical line VL. The particular degree of angle for the first and second pitch angles PA1, PA2 can be any chosen with sound engineering judgement but are at least 1°, about 5° as shown.

FIGS. 28, 30–31 and 34 show an optional feature, spring restraint means 562 for use in restraining the springs should a spring break during the operation of the platform truck 400. In the preferred embodiment, the spring restraint means 562 is a spring restraint cable 564. As shown, a separate spring restraint cable is received within each spring and includes a first end 566 operatively connected to the first segment 414 and a second end 568 operatively connected to the second segment 416. Although the cables 564 may be attached to the platform truck 400 in any manner chosen with sound engineering judgement, in the preferred embodiment shown, stop sleeves 570 are used. In particular, a first stop sleeve 570 is first connected to a first end of the cable 564. The second end of the cable 564 is then fed through an opening (not visible) in the first segment 414 and through the spring (first spring 482, for example). Next, a second stop sleeve 570 is connected to the second end of the cable 564. Then, the second stop sleeve 570 is fed through an opening (not visible) in the second segment 416. Finally, a secure plate 572 is placed between the second stop sleeve 570 and the bottom surface of the second segment 416. It should be noted that the first stop sleeve 570 is larger than the opening in the first segment 414 but that the second stop sleeve 570 is smaller than the opening in the second segment 416. It should also be noted that the length L of the restraint cable 564 is sufficient to extend from the first segment 414 through the second segment 416. In operation, should a spring break, it will be held largely in place by the cable 564 and therefore be prevented from traveling beyond the platform truck 400.

Figure 35:
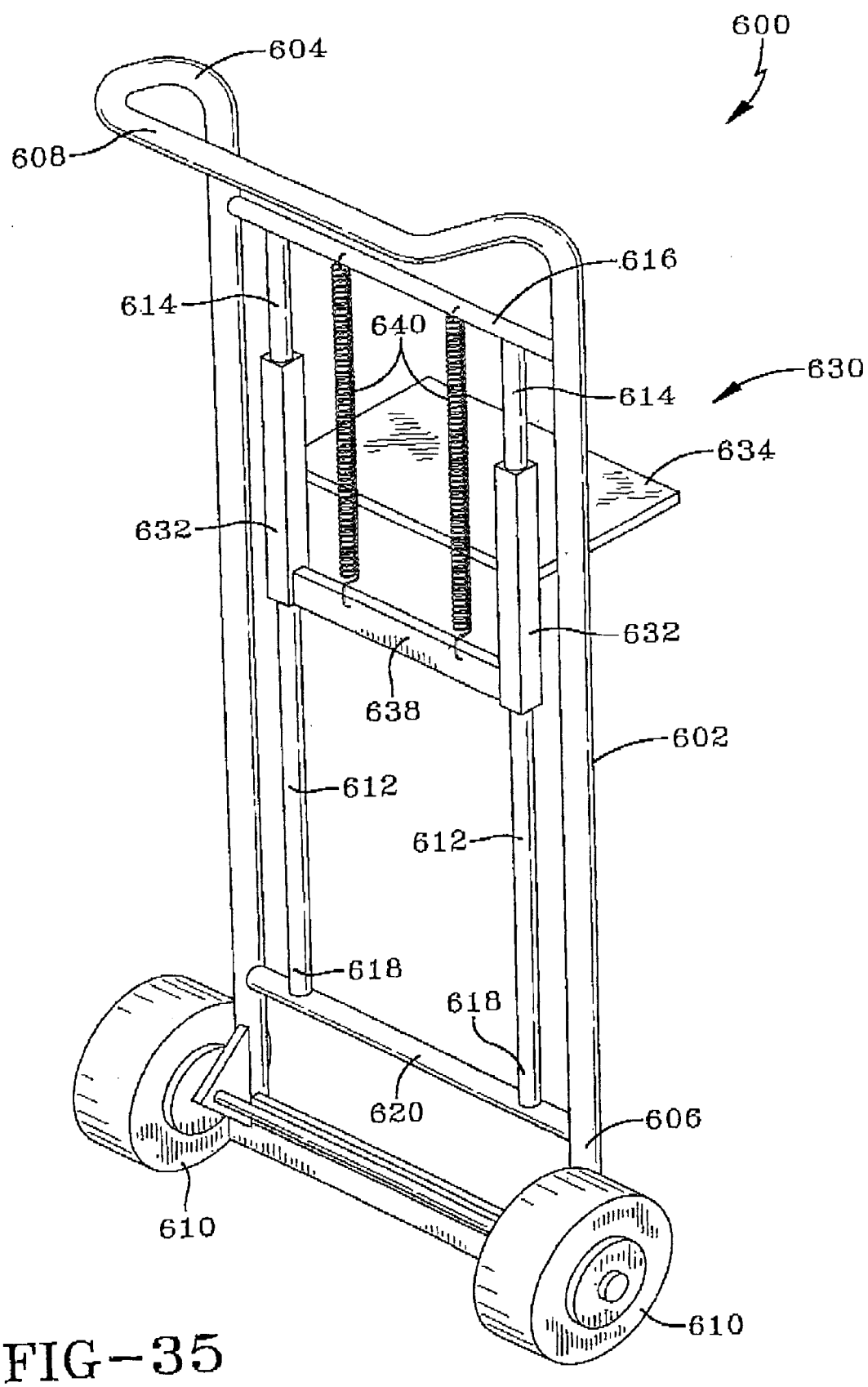
FIG. 35 is a perspective view of another embodiment, an ergonomic handtruck.

With reference now to FIG. 35, in another embodiment, a handtruck 600 is shown. The handtruck 600 has a frame assembly 602 including top and bottom portions 604, 606. A handle 608 extends from the frame assembly 602 for use by an operator in transporting the handtruck 600. A pair of wheels 610 are rotatably connected to the bottom portion 606 of the frame 602. The wheels 610 have two primary functions. One function is for use in transporting the handtruck 600 from one place to another. The second function is for pivoting the handtruck 600 about the wheels 610. This is a normal operating procedure for handtrucks and enables the operator to adjust the handtruck from a rest position to a transport position as is well known in the handtruck art. It should be noted that additional frame members (not shown) could be added to the handtruck 600 to prevent the item being transported (not shown) from inadvertently contacting the later to be described platform assembly.

With continuing reference to FIG. 35, the handtruck 600 has a pair of guide rods 612 each having first ends 614 operatively connected to a first segment 616 of the frame assembly 602 and second ends 618 operatively connected to a second segment 620 of the frame assembly 602. Although at least two guide rods 612 are preferred this invention will also work well with a single guide rod 612. The handtruck 600 also includes a platform assembly 630 that is moveable along the guide rods 612. The platform assembly 630 includes a pair of deck guides 632 that receive the guide rods 612 and a platform 634 that is connected, preferably fixedly, to the deck guides 632. The platform 634 is constructed to hold any type of item chosen with sound engineering judgement such as beverage containers and household goods.

With continuing reference to FIG. 35, within each deck guide 632 at least a first linear bearing (not visible) is positioned and receives the corresponding guide rod 612. The linear bearing is preferably similar to the linear bearing 242 described above. Most preferably, two linear bearings are positioned within each deck guide 632, at the top and bottom of the deck guide 632. A spring support bracket 638 is connected to the deck guides 632 for purposes to be discussed below. Although a single spring works well with this invention, a pair of springs 640 are shown and are used to lift the platform assembly 630 along the guide rods 612. Each spring 640 has a first end operatively connected to the first segment 616 and a second end operatively connected to the spring support bracket 638 as shown. Of course additional springs may be used to provide the required spring strength for the platform assembly 630. It should be noted that the guide rods 612 could be positioned at opposite ends of the platform 634 instead of on one side as shown. Similarly, the springs 640 could be positioned at opposite ends of the platform 634. In this way, the platform assembly 630 would not be cantilevered, as shown, but would be side supported similar to the platform assembly 280 shown in FIG. 10.

Figure 36:
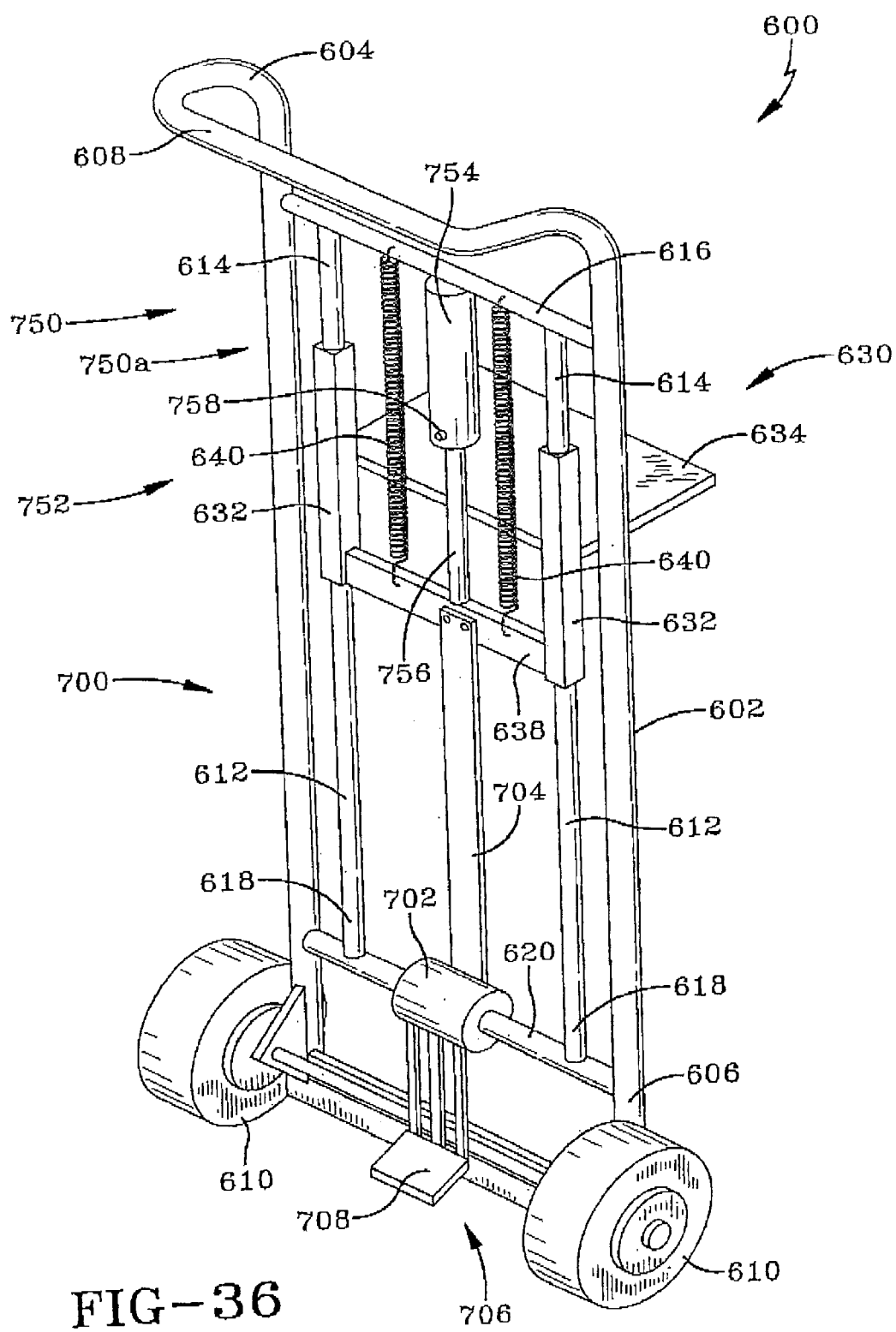
FIG. 36 is a perspective view of the ergonomic handtruck of FIG. 35 showing the optional features of a latch system and a first embodiment damping means.

With reference now to FIG. 36, the handtruck 600 is shown having two optional features, a latch system 700 and damping means 750. It should be noted that both the latch system 700 and the damping means 750 could also be used with the platform trucks discussed above. The latch system 700 can be used to prevent the platform 634 from raising under the lift force of the springs 640. This feature is especially useful in cases where the handtruck 600 is being used to carry (and lift) items that may inadvertently be removed (or lost) from the platform 634. The latch system 700 can be of any type chosen with sound engineering judgement that permits the operator to selectively lock the latch system 700 thereby selectively preventing the lift force of the springs 640 from operating or to selectively unlock the latch system 700 thereby selectively permitting the lift force of the springs 640 to operate on the platform assembly 630. The latch system 700 shown includes a recoil unit 702, a connection member 704 and locking means 706 for selectively locking and unlocking the latch system 700. The latch system 700 may work similar to the belt restraint mechanism in automobile seat belt systems as will be discussed further below. The recoil unit 702 is supported by the frame assembly 602 such as by the second segment 620 as shown. The connection member 704 has one end attached to the platform assembly 630 such as to the spring support bracket 638 as shown and another end that is connected within the recoil unit 702 where the connection member 704 can be coiled (i.e., wrapped) within the recoil unit 702. The locking means 706 provides a convenient way for the operator to lock and unlock the recoil unit 702. Preferably the locking means 706 includes a foot pedal 708 that is operatively connected to the recoil unit 702 as shown. Other types of locking means are also contemplated, a hand lever, for example, may also be used.

With continuing reference to FIG. 36, the operation of the latch system 700 will now be discussed. The latch system 700, when unlocked, permits the connection member 704 to freely extend from or coil within the recoil unit 702. When locked, however, the recoil unit 702 prevents the connection member 704 (and thus the platform assembly 630) from moving upward. Thus, when the latch system 700 is unlocked (by pressing the pedal 708 if required), the operator may unload items from the platform 634 allowing the platform assembly 630 to move upward under the lift force of the springs 640. In this condition the connection member 704 freely extends from the recoil unit 702 as the platform assembly 630 is lifted. The operator may also load items onto the platform 634 causing the platform assembly 630 to move downward and to overcome the lift force of the springs 640. In this condition the connection member 704 freely recoils within the recoil unit 702. When, on the other hand, the latch system 700 is locked (by pressing the pedal 708 again), the connection member 704 is locked in place (i.e., it is unable to extend further from the recoil unit 704) and the platform assembly 630 is unable to be lifted further. Thus, should an item inadvertently fall or be knocked off the platform 634, the platform assembly will be prevented from raising. This is the condition most useful when the item loaded onto the handtruck 600 (as well as the handtruck 600) is being transported. Once the handtruck 600 is moved to the location where the items to be loaded or unloaded reside, the operator can unlock the latch system 700 permitting the springs 640 to assist the operator by maintaining the items at the desired height for loading and unloading as discussed above.

Still referring to FIG. 36, the damping means 750 may be used to damp or slow the spring force exerted by the springs 640. This may be required, for example, when the item being carried by the handtruck 600 is to be unloaded in one step. Preferably adjustment means 752 is also provided whereby the degree of damping provided can be adjusted by the operator. The device used to provide the damping means 750 can be of any type chosen with sound engineering judgement. A first embodiment 750a, shown in FIG. 36, includes a hydraulic cylinder 754 with an extension rod 756 extending therefrom. The cylinder 754 may be supported by the frame assembly 602 such as by the first segment 616 as shown. The extension rod 756 has one end attached to the platform assembly 630 such as to the spring support bracket 638 as shown. The adjustment means 752 may include an adjustment screw 758 connected to the hydraulic cylinder 754 whereby the amount of hydraulic fluid flow within the cylinder 754 is controlled. This in turn, controls the degree of damping provided by the hydraulic cylinder 754. In operation, the operator first sets the adjustment means 752 to the desired degree of damping. The operator then unloads an item(s) as discussed above. The platform 634 will then raise under the lift force of the springs 640 but the speed of raising will be slowed (damped) due to the damping means 750. If the speed of raising is faster or slower than desired, the operator can adjust the degree of damping by re-setting the adjustment means 752 accordingly.

Figure 37:
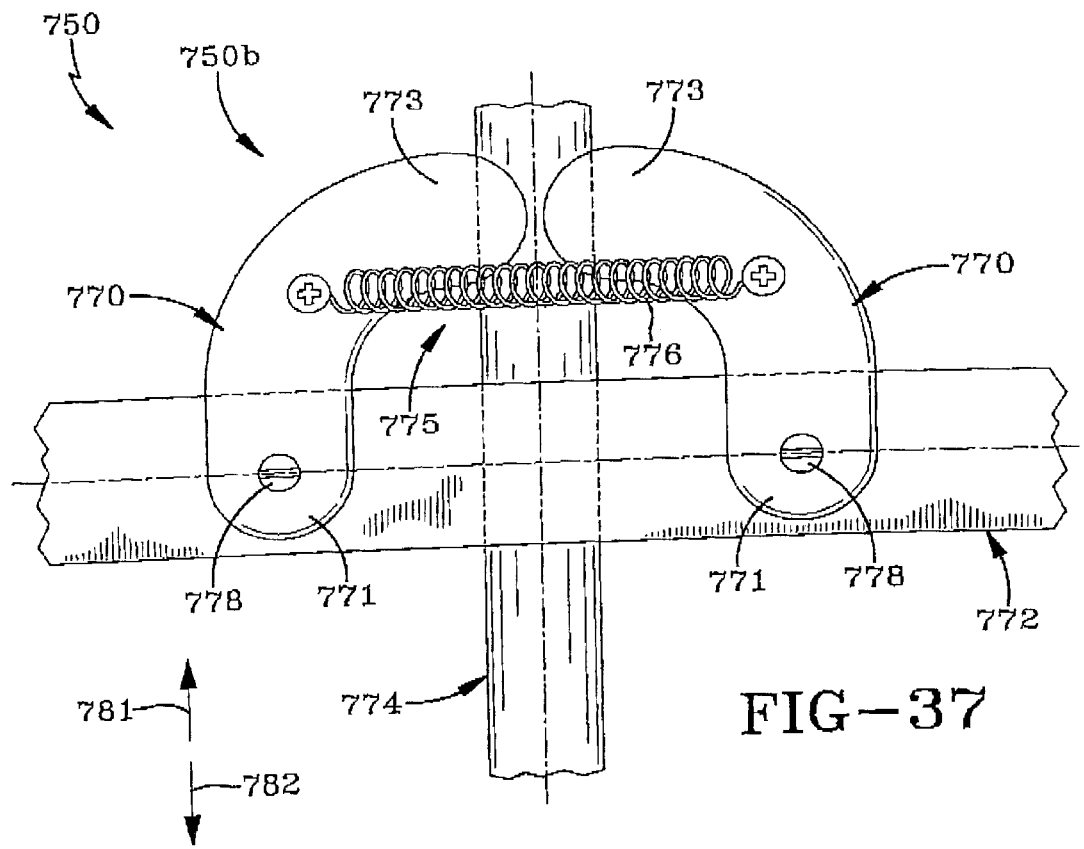
FIG. 37 is an exploded side view of a second embodiment damping means including a pair of dampers.
Figure 38:
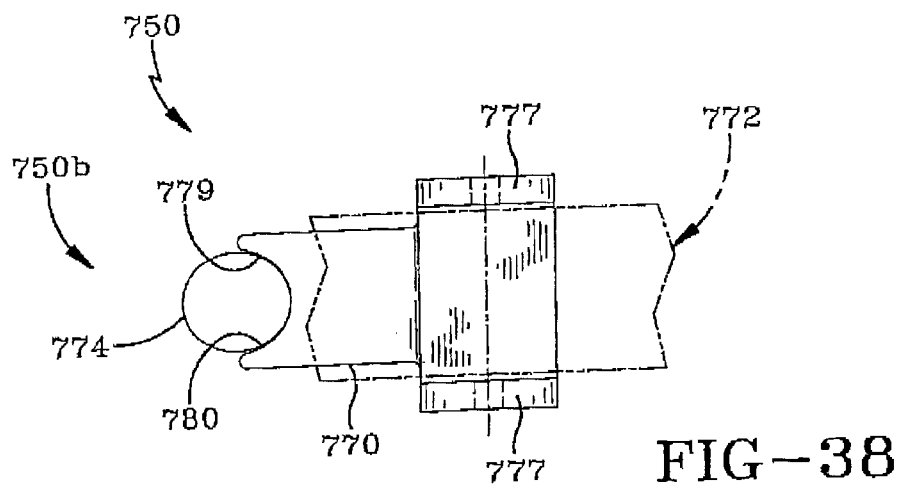
FIG. 38 is a top view of the damping means of FIG. 37 showing how the damper receives the support rod and how it attaches to the deck guide.

FIGS. 37–38 show a second embodiment 750b of damping means 750 to damp or slow the spring force exerted by the springs (not shown). Again it should be noted that this damping means 750 may be used with any of the ergonomic platform trucks discussed above. A support rod 774 is secured to the frame assembly (not shown) such as to the first and second segments 616, 620 shown in FIG. 36. The support rod 774 may be alternatively secured to the frame assembly. As shown in FIG. 37, a pair of dampers 770 are generally U-shaped and have first ends 771 that are pivotably attached to the deck guide 772 and second ends 773 that receive the support rod 774. Biasing means 775, such as spring 776, operatively biases the dampers 770 toward each other and against the support rod 774. For each damper 770, the first end 771 preferably forms a yoke portion 777 (seen best in FIG. 38) that attaches to opposite sides of the deck guide 772 and may be pivotably attached with a bolt 778. The second end 773 preferably forms a groove 779 having a surface 780 (shown in FIG. 38) that receives and contacts the support rod 774. The dampers 770 are formed of a material such as nylon that increases in friction force as the relative speed of the dampers 770 increases with respect to the support rod 774 (preferably formed of steel). In operation, as the deck guide 772 moves at ordinary operating speeds (relatively slowly) in either upward or downward directions 781, 782, the frictional force applied to the deck guide 772 through the contact of the dampers 770 to the support rod 774 is minor permitting the deck guide 772 to move freely. Should the deck guide 772 begin moving upward 781 at a faster speed however, such as if at item inadvertently fell off the platform (not shown), the spring 776 and frictional force created by the contact of the dampers 770 to the support rod 774 greatly increases thereby slowing (damping) the spring force exerted by the lift springs (not shown) and thus slowing (damping) the speed of the raising deck guide 772.

With reference now to FIGS. 39–41, in another embodiment, a self-aligning platform system 800 is shown. The self-aligning platform system 800 includes a platform 802 and platform self-aligning means 804 for automatically aligning the platform 802 with respect to the deck guides 806 and thus with respect to the frame assembly (not shown) of the platform truck. The self-aligning platform system 800 was invented to compensate for possible inconsistencies in the platform truck. These inconsistencies may be caused by inaccuracies in the material or manufacturing in the fabrication of the ergonomic platform truck. The metal used in manufacture, for example, may vary in size and may develop dimensional variations due to the heat from welding or other manufacturing techniques. It is also possible that the components may be fabricated "out of square" or that the manufacturer may make a measurement mistake. Inconsistencies to the platform truck may also be caused by forces exerted on the truck. The truck may collide with a wall or column, for example, or may be struck by another truck. These forces may cause misalignment problems for the platform truck components. The self-aligning platform system 800 makes all such possible inconsistencies non-destructive to the operation of the platform truck. In particular, as the platform 802 is lowered or raised, if the platform truck bows or if the frame is out of square, the platform 802 will automatically adjust (i.e., move) to relieve any tension or binding created thereby. Thus, the platform 802 is free to move and align itself thereby compensating for all such inconsistencies and inaccuracies. The self-aligning platform system 802 also enhances the non-binding performance provided by the deck guides 806 with linear bearings 808 as described above. It should also be noted that the self-aligning platform system 800 simplifies both the assembly and the dis-assembly (for repair, for example) of the platform truck.

With continuing reference to FIGS. 39–41, in the previously described embodiments (see FIG. 11 for example) the platform 200 was fixedly attached directly to the deck guides 204, 205, 206, 207. The self-aligning platform system 800 includes the platform 802 and the platform self-aligning means 804. Although other methods for self-aligning the platform 802 are possible with this invention, in the preferred embodiment, the platform self-aligning means 804 includes the platform 802 having a number of openings 810. Preferably, there are as many openings 810 as there are deck guides 806. Thus, as shown, the platform 802 has four openings 810 corresponding to the four deck guides 806. Extending from each deck guide 806 is a platform support 812 that is received within a corresponding platform opening 810 as shown. Of course this invention would work equally well if the platform support 812 had an opening (not shown) that received an extending portion (not shown) of the platform 802. The cross-sectional shape of the platform support 812 and the opening 810 can be any shape chosen with sound engineering judgment such as circular. In the preferred embodiment, however, they are square shaped. It is also preferred that the platform support 812 is hollow to reduce cost and weight while providing sufficient stability. The platform support 812 has an outer dimension W as shown in FIG. 41. It should be noted that the dimension X between the ends (or sides) of the platform 802 is less than the dimension Y between the deck guides 806. Thus, an adjustment gap Z is provided between the platform 802 and the deck guide 806 as seen best in FIG. 41. Preferably an adjustment gap ratio Z/W is between 0.01 and 5.00 and most preferably between 0.05 and 1.00 to provide optimum performance and to minimize material weight and cost. In operation, as the platform truck experiences misalignment forces caused, for example, by the inconsistencies noted above, the platform 802 simply moves along the platform supports 812 accordingly to relieve all stress. This self-aligning movement occurs automatically and may occur along the length of the platform supports 812 as shown by arrows 814.

The invention has been described with reference to preferred embodiments, obviously, modifications and alternations will occur to others upon a reading and understanding of the this specification. It is intended to include all such modifications and alterations in so far as they come within the scope of the appended claims or the equivalents thereof.

Having thus described the invention, it is now claimed:
What is claimed is:
1. A platform truck comprising:
a frame assembly;
a first guide rod having a first end fixedly connected to a first segment of said frame assembly and a second end fixedly connected to a second segment of said frame assembly;
a platform assembly that is selectively moveable along said first guide rod that includes,
A) a first deck guide that receives said first guide rod;
B) a platform fixedly connected to said first deck guide that is constructed so as to hold items thereon;
C) a first linear bearing that is received within said first deck guide, said first linear bearing receiving and moveable along said first guide rod; and,
D) a first spring support bracket fixedly connected to said first deck guide; and,
a first spring having first and second ends for lifting said platform assembly along said first guide rod, said first end of said first spring being operatively connected to said first segment of said frame assembly, said second end of said first spring being operatively connected to said first spring support bracket.
2. The platform truck of claim 1 further comprising:
sound protection means for use in absorbing sound from said first spring.
3. The platform truck of claim 2 wherein said sound protection means comprises:
a foam panel that substantially surround said first spring.
4. The platform truck of claim 1 further comprising:
spring restraint means for use in restraining said first spring should said first spring break.
5. The platform truck of claim 4 wherein said spring restraint means comprises:
a cable that is received within said first spring, said cable having a first end operatively connected to said first segment of said frame assembly and a second end operatively connected to said second segment of said frame assembly.
6. The platform truck of claim 1 further comprising:
a first roller guide operatively connected to said frame assembly, said first roller guide having a roller surface; and,
a first cam roller rotatably connected to said first deck guide, said first cam roller rolling along said roller surface of said first roller guide as said platform assembly is moved along said first guide rod.
7. The platform truck of claim 6 wherein said platform extends from said first deck guide in a first direction, said roller surface facing a second direction that is substantially opposite to said first direction.

8. The platform truck of claim 6 wherein said first roller guide has a channel defining first and second roller surfaces, said first cam roller rolling along said first or said second roller surface as said platform assembly is moved along said first guide rod.

9. The platform truck of claim 6 further comprising:
wherein said first deck guide has first and second ends;
wherein said first cam roller is rotatably connected to said first end of said first deck guide; and,
a second cam roller rotatably connected to said second end of said first deck guide, said second cam roller also rolling along said roller surface of said first roller guide as said platform assembly is moved along said first guide rod.

10. The platform truck of claim 1 wherein said first guide rod is positioned at a pitch angle (PA) with respect to a vertical line, said pitch angle (PA) being at least 1°.

11. A dual platform truck comprising:
a frame assembly including a first side having first and second segments and a second side having first and second segments;
a first guide rod having a first end fixedly connected to said first segment of said first side of said frame assembly and a second end fixedly connected to said second segment of said first side said frame assembly;
a second guide rod having a first end fixedly connected to said first segment of said second side of said frame assembly and a second end fixedly connected to said second segment of said second side said frame assembly;
a first platform assembly that is selectively moveable along said first guide rod that includes,
A) a first deck guide that receives said first guide rod;
B) a first platform fixedly connected to said first deck guide that is constructed so as to hold items thereon;
C) a first linear bearing that is received within said first deck guide, said first linear bearing receiving and moveable along said first guide rod; and,
D) a first spring support bracket fixedly connected to said first deck guide;
a second platform assembly that is selectively moveable along said second guide rod that includes,
A) a second deck guide that receives said second guide rod;
B) a second platform fixedly connected to said second deck guide that is constructed so as to hold items thereon;
C) a second linear bearing that is received within said second deck guide, said second linear bearing receiving and moveable along said second guide rod; and,
D) a second spring support bracket fixedly connected to said second deck guide;
a first spring having first and second ends for lifting said first platform assembly along said first guide rod, said first end of said first spring being operatively connected to said first segment of said first side of said frame assembly, said second end of said first spring being operatively connected to said first spring support bracket; and,
a second spring having first and second ends for lifting said second platform assembly along said second guide rod, said first side of said second spring being operatively connected to said first segment of said second end of said frame assembly, said second end of said second spring being operatively connected to said second spring support bracket.

12. The dual platform truck of claim 11 further comprising:
wherein said frame assembly includes first and second ends, said first and second segments of said first side of said frame assembly being positioned on said first side of said frame assembly, said first and second segments of said second side of said frame assembly also being positioned on said first end of said frame assembly;
wherein said frame assembly also includes first and second segments on said second end of said first side and first and second segments on said second end of said second side;
a third guide rod having a first end fixedly connected to said first segment on said second end of said first side of said frame assembly and a second end fixedly connected to said second segment on said second end of said first side of said frame assembly;
a fourth guide rod having a first end fixedly connected to said first segment on said second end of said second side of said frame assembly and a second end fixedly connected to said second segment on said second end of said second side of said frame assembly;
wherein said first platform assembly also includes,
A) a third deck guide that receives said third guide rod;
B) said first platform being fixedly connected to said third deck guide;
C) a third linear bearing being received within said third deck guide, said third linear bearing receiving and moveable along said third guide rod; and,
D) a third spring support bracket fixedly connected to said third deck guide, wherein said first platform assembly is moveable along said third guide rod;
wherein said second platform assembly also includes,
A) a fourth deck guide that receives said fourth guide rod;
B) said second platform being fixedly connected to said fourth deck guide;
C) a fourth linear bearing being received within said fourth deck guide, said fourth linear bearing receiving and moveable along said fourth guide rod; and,
D) a fourth spring support bracket fixedly connected to said fourth deck guide, wherein said second platform assembly is moveable along said fourth guide rod;
wherein said first end of said first spring is operatively connected to said first segment on said first end of said first side of said frame assembly;
wherein said first end of said second spring is operatively connected to said first segment on said first end of said second side of said frame assembly;
a third spring having first and second ends for lifting said first platform assembly along said third guide rod, said first end of said third spring being operatively connected to said first segment on said second end of said first side of said frame assembly, said second end of said third spring being operatively connected to said third spring support bracket; and,
a fourth spring having first and second ends for lifting said second platform assembly along said fourth guide rod, said first end of said fourth spring being operatively connected to said first segment on said second end of said second side of said frame assembly, said second end of said fourth spring being operatively connected to said fourth spring support bracket.

13. The dual platform truck of claim 12 further comprising:

a first roller guide operatively connected to said first end of said first side of said frame assembly and having a roller surface;

a second roller guide operatively connected to said first end of said second side of said frame assembly and having a roller surface;

a third roller guide operatively connected to said second end of said first side of said frame assembly and having a roller surface;

a fourth roller guide operatively connected to said second end of said second side of said frame assembly and having a roller surface; and, first, second, third and fourth cam rollers rotatably connected to said first, second, third and fourth deck guides respectively, said first and third cam rollers rolling along said roller surfaces of said first and third roller guides respectively as said first platform assembly is moved along said first and third guide rods, said second and fourth cam rollers rolling along said roller surfaces of said second and fourth roller guides respectively as said second platform assembly is moved along said second and fourth guide rods.

14. The dual platform truck of claim 13 wherein said first and third guide rods are substantially parallel and are positioned at a first pitch angle (PA1) with respect to a vertical line that is at least 1°, said second and fourth guide rods being substantially parallel and being positioned at a second pitch angle (PA2) with respect to said vertical line that is at least 1°.

15. A handtruck comprising:

a frame assembly including top and bottom portions and comprising a handle;

at least a first wheel rotatably connected to said bottom portion of said frame assembly, said handtruck being selectively pivotable about said at least first wheel during normal operation;

a first guide rod having a first end fixedly connected to a first segment of said frame assembly and a second end fixedly connected to a second segment of said frame assembly;

a platform assembly that is selectively moveable along said first guide rod that includes, A) a first deck guide that receives said first guide rod;

B) a platform fixedly connected to said first deck guide that is constructed so as to hold items thereon;

C) a first linear bearing that is received within said first deck guide, said first linear bearing receiving and moveable along said first guide rod; and, D) a spring support bracket fixedly connected to said first deck guide; and, a first spring having first and second ends for lifting said platform assembly along said first guide rod, said first end of said first spring being operatively connected to said first segment of said frame assembly, said second end of said first spring being operatively connected to said first spring support bracket.

16. The handtruck of claim 15 further comprising:

a second guide rod having a first end fixedly connected to said first segment and a second end fixedly connected to said second segment;

said platform assembly being moveable along said first and second guide rods, said platform assembly further comprising, A) a second deck guide that receives said second guide rod;

B) said platform being fixedly connected to said second deck guide;

C) a second linear bearing that is received within said second deck guide, said second linear bearing receiving and moveable along said second guide rod; and, D) said second deck guide being fixedly connected to said spring support bracket; and, a second spring having first and second ends for lifting said platform assembly along said second guide rod, said first end of said first spring being operatively connected to said first segment of said frame assembly, said second end of said second spring being operatively connected to said spring support bracket.

17. The handtruck of claim 16 further comprising:

a third linear bearing that is received within said first deck guide, said third linear bearing receiving and moveable along said first guide rod; and, a fourth linear bearing that is received within said second deck guide, said fourth linear bearing receiving and moveable along said second guide rod.

18. The handtruck of claim 15 further comprising:

a latch system for use in selectively preventing said platform assembly from moving along said first guide rod.

19. The handtruck of claim 18 wherein said latch system comprises:

a recoil unit that is mounted to said frame assembly;

a connection member having a first end operatively connected to said platform assembly and a second end operatively connected to said recoil unit; and, locking means for selectively locking said latch system.

20. The handtruck of claim 19 wherein said locking means comprises a foot pedal operatively connected to said recoil unit.

21. The handtruck of claim 15 further comprising:

damping means for use in damping the spring force of said first spring.

22. The handtruck of claim 21 wherein said damping means comprises:

an adjustment means for use in adjusting the degree of damping provided by said damping means.

23. The handtruck of claim 22 wherein said damping means comprises:

a hydraulic cylinder operatively attached to said frame assembly.

24. The handtruck of claim 21 wherein said damping means comprises:

a support rod operatively attached to said frame assembly; and, a first damper having a first end pivotably attached to said first deck guide and a second end frictionally contacting a first side of said support rod.

25. The handtruck of claim 24 wherein said damping means further comprises:

a second damper having a first end pivotably attached to said first deck guide and a second end frictionally contacting a second side of said support rod; and, biasing means for biasing said first and second ends of said first and second dampers against said support rod.

26. The platform truck of claim 1 further comprising:

a latch system for use in selectively preventing said platform assembly from moving along said first guide rod.

27. The platform truck of claim 26 wherein said latch system comprises:

a recoil unit that is mounted to said frame assembly;

a connection member having a first end operatively connected to said platform assembly and a second end operatively connected to said recoil unit; and, locking means for selectively locking said latch system.

28. The platform truck of claim 27 further comprising:

damping means for use in damping the spring force of said first spring.

29. A platform truck comprising:

a frame assembly;

a first guide rod having a first end fixedly connected to a first segment of said frame assembly and a second end fixedly connected to a second segment of said frame assembly;

a platform assembly that is selectively moveable along said first guide rod comprising:
  A) a first deck guide that receives said first guide rod;
  B) a platform fixedly connected to said first deck guide that is constructed so as to hold items thereon;

lifting means for lifting said platform assembly along said first guide rod; and, a latch system for use in selectively preventing said platform assembly from moving along said first guide rod, said latch system comprising:
  A) a recoil unit that is mounted to said frame assembly;
  B) a connection member having a first end operatively connected to said platform assembly and a second end operatively connected to said recoil unit; and,
  C) locking means for selectively locking said latch system.

30. The platform truck of claim 29 further comprising:

damping means for use in damping the lifting means.

31. A platform truck comprising:

a frame assembly;

a first guide rod having a first end fixedly connected to a first segment of said frame assembly and a second end fixedly connected to a second segment of said frame assembly;

a self-aligning platform assembly that is selectively moveable along said first guide rod comprising:
  A) a first deck guide that receives said first guide rod;
  B) a platform constructed so as to hold items thereon; and,
  C) platform self-aligning means for automatically aligning said platform with respect to said first deck guide;

a first spring support bracket fixedly connected to said first deck guide; and, a first spring having first and second ends for lifting said platform assembly along said first guide rod, said first end of said first spring being operatively connected to said first segment of said frame assembly, said second end of said first spring being operatively connected to said first spring support bracket.

32. A platform truck comprising:

a frame assembly;

a first guide rod having a first end fixedly connected to a first segment of said frame assembly and a second end fixedly connected to a second segment of said frame assembly;

a self-aligning platform assembly that is selectively moveable along said first guide rod comprising:
  A) a first deck guide that receives said first guide rod;
  B) a platform constructed so as to hold items thereon; and,
  C) platform self-aligning means for automatically aligning said platform with respect to said first deck guide;

a first platform support extending from said first deck guide; and, said platform having a first end with a first opening for selectively receiving said first platform support, said platform being selectively moveable along said first platform support.

33. The platform truck of claim 34 further comprising:

a second guide rod having a first end fixedly connected to a third segment of said frame assembly and a second end fixedly connected to a fourth segment of said frame assembly;

a second deck guide that receives said second guide rod;

a second platform support extending from said second deck guide; and, said platform having a second end with a second opening for selectively receiving said second platform support, said platform being selectively moveable along said second platform support.

34. The platform truck of claim 33 wherein said second platform support has an outer dimension (W), said platform has a dimension (X) between said first and second ends of said platform and said platform truck has a dimension (Y) between said first and second deck guides, said dimensions (X) and (Y) forming adjustment gaps (Z) between said platform and said first and second deck guides, an adjustment gap ratio Z/W is between 0.05 and 1.00.

35. A method of aligning a platform comprising the steps of:

providing a platform truck that includes a frame assembly and a first guide rod having a first end fixedly connected to a first segment of the frame assembly and a second end fixedly connected to a second segment of the frame assembly;

providing a self-aligning platform assembly that is selectively moveable along the first guide rod and that includes a first deck guide that receives the first guide rod, a platform constructed so as to hold items thereon and platform self-aligning means;

providing a first platform support extending from the first deck guide; and, providing a first end of the platform with a first opening that receives the first platform support;

applying a misalignment force to the platform truck; and, automatically aligning the platform with respect to the first deck guide by the platform along the first platform support.

* * * * *